(12) United States Patent  
Lesher et al.

(10) Patent No.: US 10,503,176 B2
(45) Date of Patent: Dec. 10, 2019

(54) SELF-ORDERING OF FLEET VEHICLES IN A PLATOON

(71) Applicant: Bendix Commercial Vehicle Systems LLC, Elyria, OH (US)

(72) Inventors: Michael Lesher, Elyria, OH (US); T. Stephen Miller, Jr., Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 303 days.

(21) Appl. No.: 15/395,219

(22) Filed: Dec. 30, 2016

(65) Prior Publication Data

US 2018/0188746 A1 Jul. 5, 2018

(51) Int. Cl.
*G05D 1/02* (2006.01)
*G08G 1/00* (2006.01)
*B60W 40/08* (2012.01)

(52) U.S. Cl.
CPC ........... *G05D 1/0295* (2013.01); *B60W 40/08* (2013.01); *G05D 1/0217* (2013.01); *G05D 1/0287* (2013.01); *G08G 1/20* (2013.01); *G08G 1/22* (2013.01); *G05D 2201/0213* (2013.01)

(58) Field of Classification Search
None
See application file for complete search history.

(56) References Cited

U.S. PATENT DOCUMENTS

| 9,632,507 B1 | 4/2017 | Korn |
| 2008/0012726 A1 | 1/2008 | Publicover |
| 2010/0056835 A1 | 3/2010 | Dandekar et al. |
| 2010/0256835 A1 | 10/2010 | Mudalige |
| 2010/0256852 A1 | 10/2010 | Mudalige |
| 2015/0243172 A1* | 8/2015 | Eskilson ............ A61B 5/18 701/1 |

(Continued)

OTHER PUBLICATIONS

Invitation to Pay Additional Fees and Communication Relating to the Results of the Partial International Search from corresponding International Application No. PCT/US2017/068888, dated Apr. 30, 2018; 16 pages.

(Continued)

*Primary Examiner* — Christian Chace
*Assistant Examiner* — Kyung J Kim
(74) *Attorney, Agent, or Firm* — Tucker Ellis LLP; Michael Hudzinski

(57) ABSTRACT

Highway vehicle platoon management is provided. Driver quality parameters are used together with vehicle physical characteristic and performance information to select an ordering of the vehicles within the platoon. The vehicles within the platoon mutually self-order to select the ordering of the vehicles within the platoon for enhanced safety and efficiency. The driver quality parameters together with the vehicle physical characteristic and performance information is also used to reward best drivers with preferred locations within the platoon. The vehicles within the platoon mutually self-order to reward best drivers with preferred locations within the platoon. An existing vehicle platoon is selectively split into two or more smaller platoons for improving overall safety and efficiency. Two or more smaller vehicle platoons are selectively aggregated into a larger single platoon for improving overall safety and efficiency.

21 Claims, 16 Drawing Sheets

(56) References Cited

U.S. PATENT DOCUMENTS

2016/0054735 A1 2/2016 Switkes
2017/0249844 A1 8/2017 Perkins

OTHER PUBLICATIONS

U.S. Office Action from related U.S. Appl. No. 15/395,160, dated Oct. 13, 2017.
International Search Report and Written Opinion from corresponding International Application No. PCT/US2017/068888, dated Jun. 25, 2018; 16 pages.

* cited by examiner

SELF-ORDERING OF FLEET VEHICLES IN A PLATOON

CROSS REFERENCE TO RELATED APPLICATIONS

This application is related to U.S. application Ser. No. 15/395,160, filed Dec. 30, 2016, entitled: VARYING THE DISTANCE BETWEEN VEHICLES IN A PLATOON; U.S. application Ser. No. 15/395,251, filed Dec. 30, 2017, entitled: DETECTION OF EXTRA-PLATOON VEHICLE INTERMEDIATE OR ADJACENT TO PLATOON MEMBER VEHICLES; and U.S. application Ser. No. 15/395,214, filed Dec. 30, 2016, entitled: "V" SHAPED AND WIDE PLATOON FORMATIONS, the contents of each of these applications being incorporated herein by reference in their entirety.

TECHNICAL FIELD

The embodiments herein relate generally to highway vehicle platoon management. More specifically, particular embodiments relate to commercial highway vehicle platoon management wherein vehicle performance characteristic parameters are used to select an ordering of the vehicles within the platoon, and to reward best drivers with preferred locations within the platoon based on driver quality parameters and metrics. Further, particular embodiments relate to selecting the ordering of the vehicles within the platoon by splitting an existing vehicle platoon into two or more smaller platoons and, conversely, aggregating two or more smaller vehicle platoons into a larger single platoon. Although the invention will be described with reference to these particular example embodiments, it is to be appreciated that the claimed invention is also amenable to other applications.

BACKGROUND

It is known that two or more vehicles moving along a roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane. More complicated platoons can span two or more roadway lanes but, overall, the goals of providing enhanced efficiency but more importantly safety to both the platooned vehicles as well as to the other non-platooning vehicles on the roadway most usually dictate the single lane platoon incarnation.

The aerodynamic geometry of the vehicles within a platoon is a significant factor used in determining an ordering of the vehicles. As a general rule, a physically smaller vehicle following a physically larger vehicle will provide a greater benefit. Since commercial box trucks and tractors towing box trailers are in general taller and wider than most flatbed tractor trailer combinations, a maximum aerodynamic benefit and resultant fuel savings is realized by ordering vehicles classified this way such that the commercial box truck and tractors towing box trailers take the leader position(s) in the platoon, while the flatbed tractor trailer rigs take the follower position(s) in the platoon.

In addition to the above, a small spacing between platooned vehicles gives greater benefit in terms of reduced energy consumption. However, a tight spacing between platooned vehicles requires that careful attention be paid to various functional and operational characteristics and capabilities of the vehicles and other external conditions including the overall size of the platoon, weather conditions, relative braking abilities between vehicle pairs, relative acceleration abilities, relative load or cargo size and weight including required stopping distance, and the like. Special attention must also be paid to characteristics of the roadway such as roadway incline, decline, and turn radii. These various safety and efficiency parameters implicate directly or indirectly inter-vehicle safety considerations as well as the overall safety of multiple vehicle platoons.

It is to be appreciated that drivers of vehicles within a platoon have an increased responsibility to operate their vehicles and to operate within the platoon, in a safe manner due to the close operating distance of the platooning vehicles. A Network Operations Center (NOC) may be able to bring two vehicles together which have the capability of platooning, but the drivers of each vehicle may have little to no experience with the other driver(s) in the platoon. One driver may be very cautious and disable the platoon at a moment's notice while another driver may not be attentive and not disable the platoon when necessary or, react too late to surrounding road conditions. When drivers initiate a platoon, they have no way of knowing if the driver of the other vehicle is a good "Platooning" driver.

Although many commercial vehicles are highly sophisticated and are equipped with Adaptive Cruise Control (ACC) and/or Adaptive Control with Braking (ACB) used for maintaining a safe relative distance between a leading vehicle and a trailing vehicle, and collision mitigation (CM) systems for avoiding or lessening the severity of impacts between the trailing and forward vehicles using various combinations of transmission, vehicle retarder, and foundation brake controls, the vehicles are not completely autonomous. More particularly, humans drive commercial vehicles over roadways oftentimes together with other vehicles and current ACC, ACB, and CM systems do not use driver quality and/or vehicle performance parameters as factors in their control implementation such as to recommend a vehicle group formation, ordering within the formation, or a fragmenting of the formation when it might be advantageous to split the formation.

One SAE standard is J2945 directed in general to Dedicated Short Range Communication (DSRC), and a work in process portion of that standard is J2945/6 is directed to performance requirements for cooperative adaptive cruise control and platooning. J2945/6 is intended to define the data exchange that will be necessary for coordinated platoon maneuvers, and that definition of the categories should start with differentiating between platooning and ACC, then determining message sets and performance to realize cooperative vehicles. However, J2945/6 also does not use driver quality and/or vehicle performance parameters as factors in platoon control implementation.

Given the above, it will be helpful to include data relating to one or more driver quality and/or performance parameter(s) in the ordering determination of vehicles in a platoon. Providing driver parameter data including driver quality based on a sum of collected quality rankings such as, for example, platooning experience, current time spent driving, number of hard braking events, number of lane departure warning (LDW) alerts, and the like would be desirable additional information that could to be added into the vehicle platoon ordering and/or platoon splitting and platoon formation calculation and determinations.

In addition to the above, as roadways improve and as vehicles become more sophisticated, travelling congregations having four or more randomly grouped vehicles are not uncommon. Therefore, platoon management taking into account all available parameters including for example driver parameter data including driver quality, becomes ever more important to safe and efficient operation.

It is not surprising that the range of capabilities of vehicles joining these ad hoc "platoons" can be very wide. New aerodynamic and powerful vehicles can join a travelling congregation having some old, slow and heavy vehicles. In certain situations, however, it might be desirable to split a large group of four or more dissimilar vehicles into two or more smaller groups where it can be shown that, overall, safety and efficiency benefits inure to the vehicles of the split groups relative to the original larger existing group. Conversely, it might be beneficial to selectively agglomerate two or more smaller groups into a single larger group where it can be shown that, overall, safety and efficiency benefits inure to the yet to be formed larger single group.

The present embodiments provide for new and improved self-ordering of vehicles in a formal platoon, for new and improved platoon formation, and for new and improved platoon splitting.

SUMMARY OF THE EXAMPLE EMBODIMENTS

The embodiments permit two or more vehicles moving along a roadway to cooperate as a road train or a "platoon" for mutual safety and efficiency benefits.

In accordance with one aspect, one or more driver quality parameters are used for sorting vehicle order within a platoon. The driver quality parameters are, in accordance with an embodiment, based on a sum of collected quality rankings such as, for example, platooning experience, number of hard braking events, number of lane departure warning (LDW) alerts, and the like.

In accordance with another aspect, one or more driver quality parameters are used to reward the best driver with a preferred or best position within the platoon.

In accordance with yet another aspect, an original single platoon is selectively split into two or more smaller platoons for improved collective safety and efficiency of the two or more smaller platoons relative to the original single platoon.

In one embodiment, the splitting of an original platoon into two or more smaller platoons is based on inter-vehicle V2V Unicast communication between adjacent vehicles for determining a discrepancy in relative safety and/or efficiency criteria ratings between adjacent vehicles above a predetermined threshold.

In another embodiment, the splitting of an original platoon into two or more smaller platoons is based on inter-vehicle V2V Broadcast communication between plural adjacent vehicles for determining an overall safety and/or efficiency criteria rating of the two or more smaller platoons to be greater than the overall safety and/or efficiency criteria rating of the original platoon.

In yet another aspect, a single larger platoon is selectively formed by joining two or more smaller platoons into the single larger platoon for improved safety and efficiency of the single larger platoon relative to the collective safety and efficiency of the two or more smaller platoons.

In one embodiment, the joining of two or more smaller platoons into a larger single platoon is based on inter-vehicle V2V Unicast communication between adjacent vehicles for determining a congruence or equivalence in relative safety and/or efficiency criteria ratings between adjacent vehicles above a predetermined threshold.

In one embodiment, the joining of two or more smaller platoons into a larger single platoon is based on inter-vehicle V2V Broadcast communication between plural adjacent vehicles for determining an overall safety and/or efficiency criteria rating of the larger single platoon to be greater than the overall safety and/or efficiency criteria rating of the two or more smaller platoons.

Other embodiments, features and advantages of the example embodiments will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
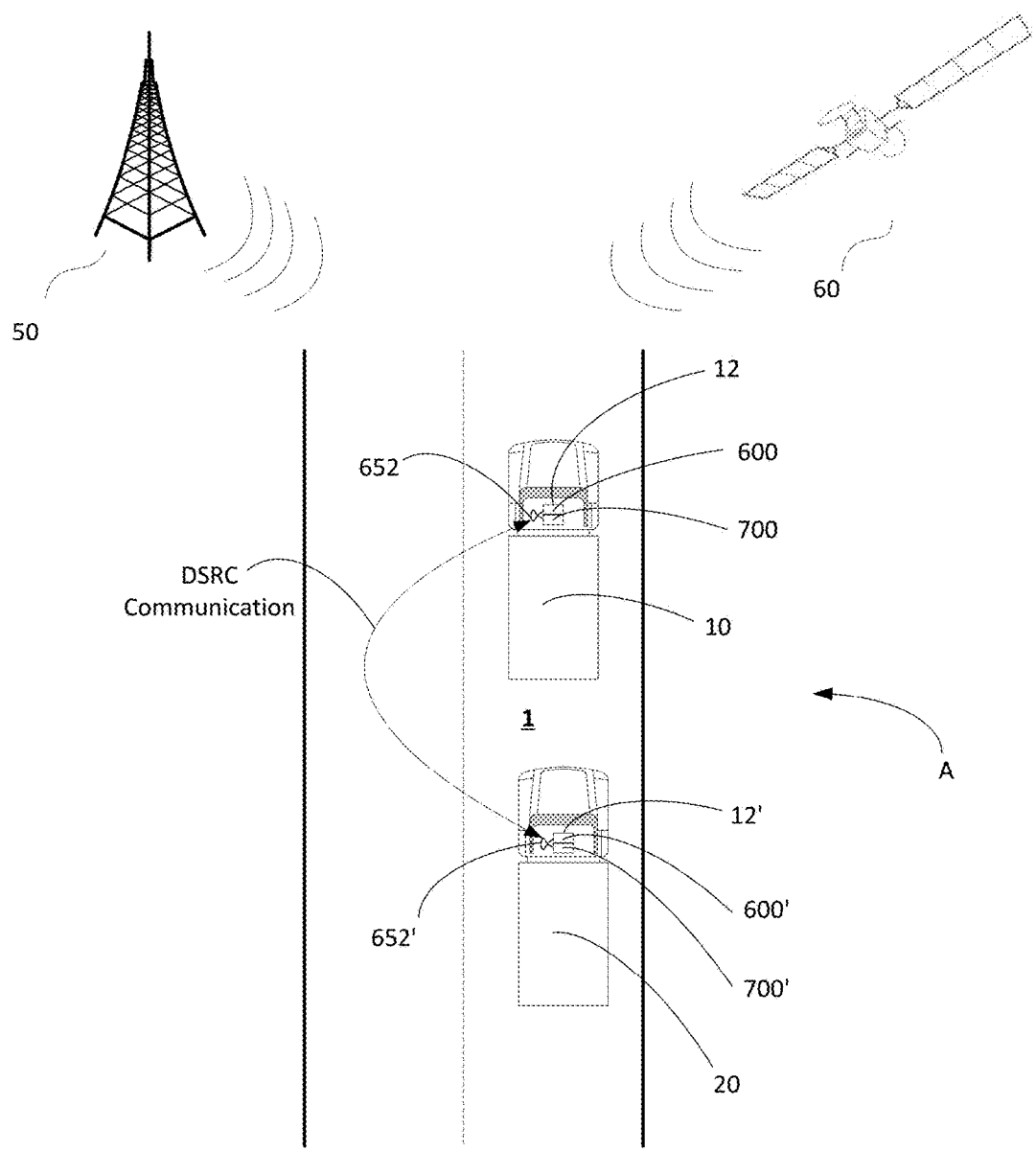
FIG. 1 depicts operation of an exemplary platoon in accordance with an embodiment.

Referring now to the drawings, wherein the showings are for the purpose of illustrating the example embodiments only, and not for purposes of limiting the same, FIG. 1 illustrates a basic platoon A including a host or leader vehicle 10 in traffic with a second or follower vehicle 20 in accordance with the present disclosure. As shown, the follower vehicle 20 is travelling seriatim proximate to the leader vehicle 10 in an ordered platoon A along a roadway 1. The leader vehicle 10 is provided with an electronic control system 12 which includes a data collection and communication module portion 600 and a platooning control portion 700 to be described in greater detail below. Similarly, the follower vehicle 20 is also provided with an electronic control system 12' which includes a data collection and communication module portion 600' and a platooning control portion 700'. In the example embodiments to be described herein, each of the two or more vehicles comprising the various platoons that will be described include the same or equivalent electronic control system 12, the same or equivalent data collection and communication module portion 600, and the same or equivalent platooning control portion 700, although other control systems having the functionality to be described herein may equivalently be used as necessary or desired.

In the example embodiment illustrated, the electronic control systems 12, 12' of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential, wherein the embodiments herein are directed primarily to vehicle self-ordering i.e. platoon ordering beneficially without the need to consult with or act under the direction of or in concert with the remote wireless communication system 50, the remote satellite system 60, the remote fleet management facility, or the like.

In addition to the above, the electronic control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon A can communicate with each other locally for self-ordering into a platoon without the need for input from the NOC in accordance with the embodiments herein. The vehicles forming the basic platoon A can also communicate with one or more other vehicles locally without the need for input from the NOC for negotiating the one or more other vehicles into the platoon in accordance with the embodiments herein. The vehicles forming the basic platoon A can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are Platoon capable and the driver has indicated, via a switch or user interface, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

FIGS. 2a-2d illustrate self-ordering of fleet vehicles in a platoon wherein the driver having the highest driver quality rating (or "best" driver) among the platoon drivers is rewarded by locating the best driver in a most preferred or best position in the platoon in accordance with an example embodiment. Preferably, each vehicle uses a bubble sort or similar processing technique or the like in order to determine whether it should move ahead of, or remain behind, the vehicle immediately ahead. The bubble sort processing is preferred in the example embodiment because it results in moving the vehicle having the worst credentials to the back of the platoon quickly. This is also important when safety parameters are used in the bubble sort processing since the platoon becomes reorganized quickly in the embodiment to drop the vehicle having the worst credentials to the back of the platoon thereby improving the overall safety and performance and efficiency of the platoon.

Figure 2A:
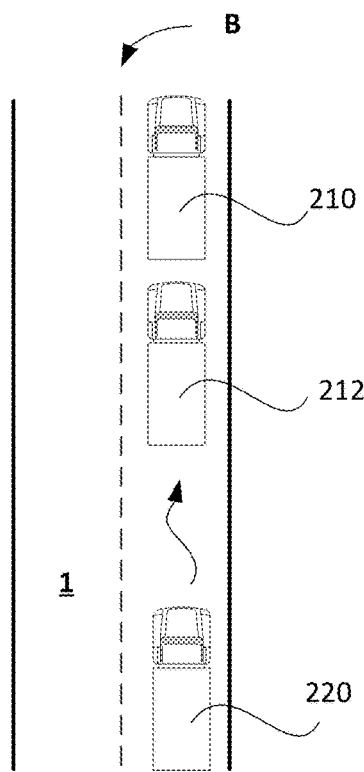
FIGS. 2a-2d depict a sequence of operation for self-reordering of vehicles in a platoon wherein a new vehicle joins the platoon and the best driver is rewarded with a best position within the platoon in accordance with an embodiment.

In the embodiment, driver quality parameters may include various metrics such as, for example, driver platooning experience, driver lane departure warning (LDW) behavior metrics, hard braking event metrics, or the like. FIG. 2a illustrates an initial platoon B including a lead vehicle 210 and a following vehicle 212. A third or new member vehicle 220 follows behind the initial platoon B along the roadway 1. The third or new member vehicle 220 is not yet part of the platoon B in FIG. 2a.

Figure 2B:
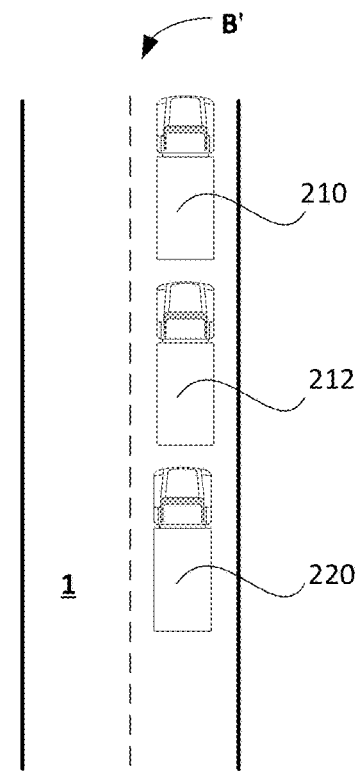

The new member vehicle 220 reaches the platoon B as shown in FIG. 2b, and initiates communication with one (V2V Unicast—only one vehicle reciprocating to the broadcast by the new member vehicle 220) or with both of the platoon vehicles 210, 212 (V2V Broadcast—both vehicles reciprocating to the broadcast by the new member vehicle 220) in order to negotiate an acceptance into the platoon B in accordance with a decision control protocol to be described in greater detail below. Overall, however, the negotiation is for purposes of negotiating the acceptance into the platoon and also to mutually establish self-ordering of the vehicles 210, 212, and 220. In the example embodiment, the negotiation includes sharing vehicle physical performance and other parameter data as well such as driver quality data between the vehicles 210, 212, and 220 in order to establish or otherwise identify a driver among the vehicles having the highest quality ranking (the "best" driver), and then to reward the best driver by locating the best driver in a best position in the platoon or in a position within the platoon desired by the best driver. In an embodiment, absent any overriding safety concerns, the best driver obtains the best position irrespective of the results of self-ordering based on the physical parameters and performance capabilities of the platooned vehicles. That is, in this embodiment, the driver having the highest driver quality ranking is inserted into the platoon in an order ahead of all other drivers regardless of the characteristics of their vehicles, absent any overriding safety concerns. In another embodiment, absent any overriding safety concerns, the best driver obtains the best position possible taking into consideration the physical parameters and performance capabilities of the platooning vehicles. That is, the driver is inserted into the platoon in an order ahead of all other drivers having similar or the same vehicle characteristics, absent any overriding safety concerns.

Figure 2C:
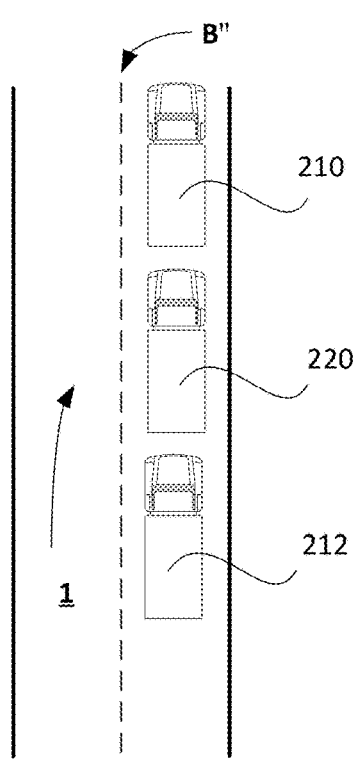

FIG. 2c shows that, after concluding a mutual self-ordering negotiation between the second 212 and new member 220 vehicles, the driver of the new member vehicle 220 was determined to be the driver having the higher driver quality ranking relative to the driver quality ranking of the driver of the second vehicle 212, and is accordingly rewarded by the second vehicle 212 of the platoon B to assume the lead or host roll at the front relative to the vehicle 212 thereby establishing a new platoon B' illustrated in FIG. 2c.

Figure 2D:
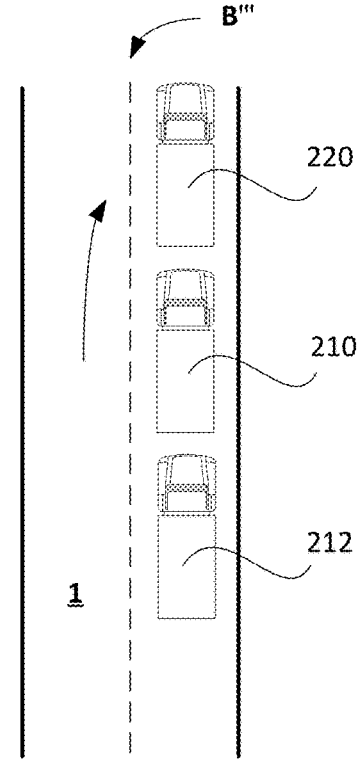

The bubble sort of the new platoon B' continues in FIG. 2c wherein after concluding a mutual self-ordering negotiation between the original lead vehicle 210 and the new member vehicle 220, the driver of the new member vehicle 220 is determined to have the best driver quality rating relative to the driver quality rating of the original lead vehicle 210, and is accordingly rewarded by the vehicle 210 of the platoon B to assume the lead or host roll at the front relative to the vehicle 210 thereby establishing a further new platoon B" illustrated in FIG. 2d. It is to be appreciated that, in accordance with the embodiments herein, the arrangement of the platoons B, B', and B" is not static but rather is dynamic wherein the persistent inter-vehicle bubble sorting between adjacent vehicles occurs continuously thereby ensuring that the platooned vehicles are properly arranged.

Figures 3A, 3B, 3C:
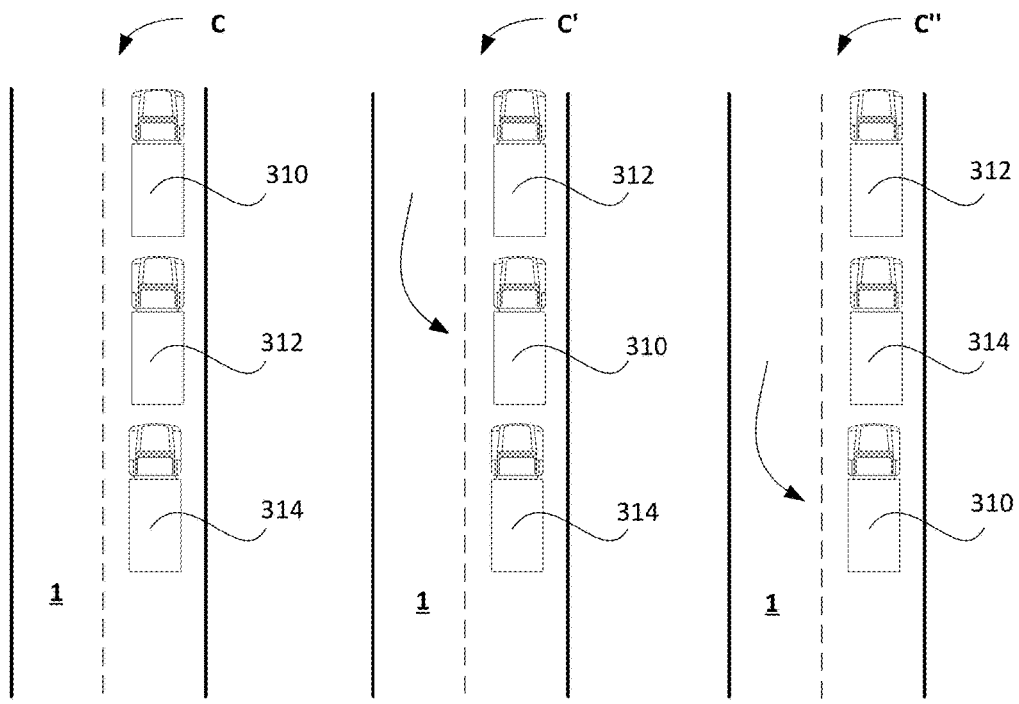
FIGS. 3a-3c depict a sequence of operation for self-reordering of vehicles in a platoon wherein the vehicle order is resorted based on changes in one or more driver quality parameters occurring while platooning in accordance with an embodiment.

Next, FIGS. 3a-3c are a schematic illustration in accordance with a further example embodiment herein of self-ordering of fleet vehicles in a platoon by resorting the vehicle order based on relative driver quality ranking. In the embodiment, driver quality parameters may include various metrics such as, for example, driver platooning experience, driver lane departure warning (LDW) alert or behavior metrics, hard braking event metrics, or the like. It is to be appreciated that the description of this embodiment is highly simplified and assumes that all other parameters such as, for example, safety and physical vehicle construction parameters between the vehicles are identical so that only the driver quality parameter data is exposed as the sole parameter, but for ease of description purposes only.

Then turning first to FIG. 3a, a platoon C includes a set of three vehicles including an initial lead vehicle 310, and a pair of following vehicles including a second vehicle 312 and a third vehicle 314. The vehicles exchange various data using a V2V Unicast communication protocol (only one vehicle reciprocating to the broadcast by the transmitting member vehicle) and V2V Broadcast communication protocol (plural vehicles reciprocating to the broadcast by the transmitting member vehicle) and establish amongst themselves, in accordance with a decision control protocol to be described in greater detail below, a new self-ordering of the vehicles into a platoon based on bubble sorting driver quality parameters of the drivers of the respective vehicles.

As shown in FIG. 3b, after mutually determining between the initial lead vehicle 310 and the original second vehicle 312 that the driver of the original second vehicle 312 has, relative to the initial lead vehicle 310, the overall best set of parameters selected from for example, the most platooning experience, least lane departure warnings, least hard breaking events historically, or the like. Accordingly, the driver of the second vehicle 312 is the recipient after the negotiation of the lead or host position. Using the bubble sort processing, the original second vehicle 312 requests an overtake, and the initial lead vehicle 310 grants the overtake by the original second vehicle 312 thereby forming a new platoon C'. In the example, the quality parameters of the driver of the initial lead vehicle 310 might degrade or become degraded or stale for various reasons. These reasons might include, for example, the driver of the initial lead vehicle 310 being actively driving for too long of a period, driving erratically setting off LDW alerts, or the like.

In addition, after mutually determining that the driver of the original third vehicle 314 has a better quality record relative to the driver of the initial lead vehicle 310, the logic in the electronic control systems of the set of vehicles 310-314 self-order into a new platoon C″ as shown in FIG. 3c wherein the vehicle 312 with the driver having the highest quality is at the leader position, followed by the vehicle 314 with the driver having the next highest quality, followed by the vehicle 310 with the driver having the lowest driver quality. In the example embodiment illustrated, the quality data of the driver of the initial lead vehicle 310 degraded during platooning wherein the persistent bubble sorting amongst the platooned vehicles 310-314 caused the reformation of the initial platoon C to the intermediate platoon C′ then to the final platoon C″. It is to be appreciated that, in accordance with the embodiments herein, the arrangement of the platoons C, C′, and C″ is not static but rather is dynamic wherein the persistent inter-vehicle bubble sorting between adjacent vehicles continuously ensures that the platooned vehicles are properly arranged.

Figure 4A:
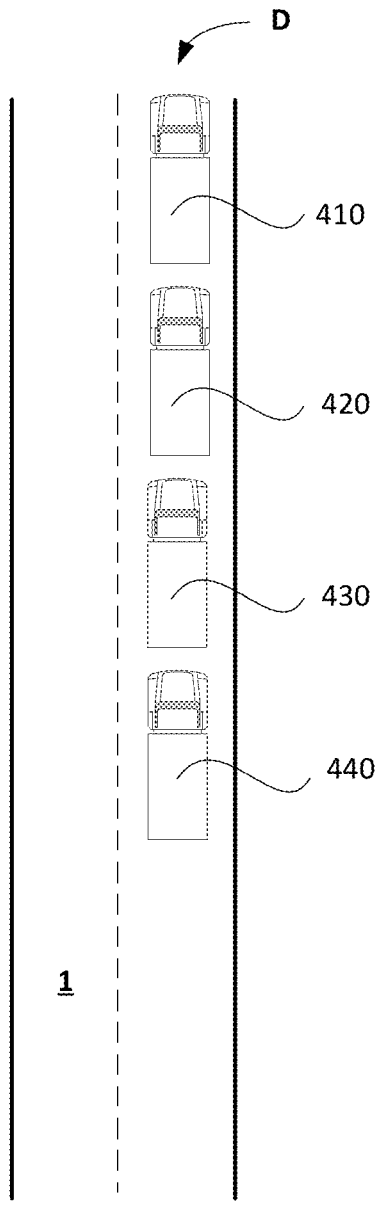
FIGS. 4a and 4b depict a sequence of operation for self-reordering of vehicles in a platoon by splitting the platoon into two smaller platoons in accordance with an embodiment.
Figure 4B:
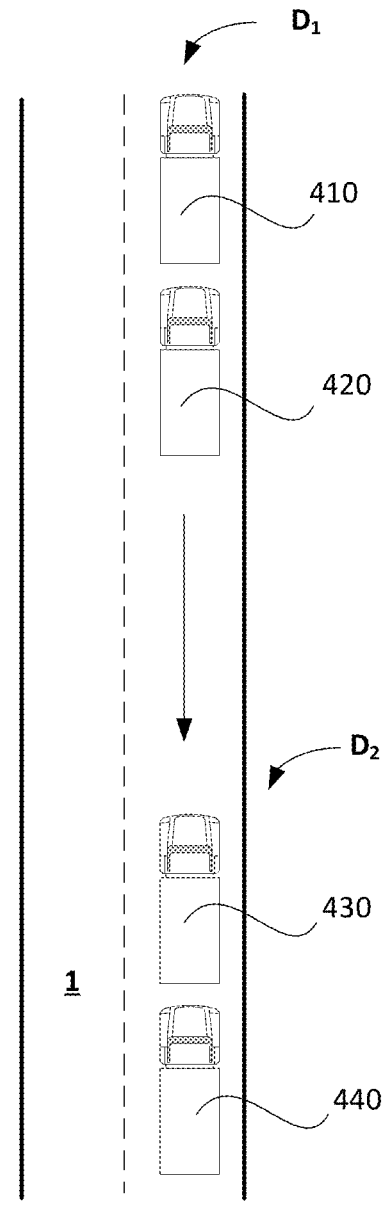

Platoon Splitting:

FIGS. 4a and 4b are schematic illustrations of a further example embodiment wherein a set of vehicles 410, 420, 430, and 440 forming a platoon D reconstitute the system by splitting the original platoon D into two (2) smaller platoons $D_1$ and $D_2$. FIG. 4a shows the vehicles 410, 420, 430, and 440 of the original platoon D arranged serially along the roadway 1. Then, using V2V Unicast communication protocol (only one vehicle reciprocating to the broadcast by the transmitting member vehicle) and/or V2V Broadcast communication protocol (plural vehicles reciprocating to the broadcast by the transmitting member vehicle) and one or more decision control protocol(s) to be described in greater detail below, the vehicles 410, 420, 430, and 440 self-reorganize or otherwise reconstitute the platoon system D by permitting the initial lead vehicle 410 to maintain its lead position relative to a following vehicle 420 in a first sub-platoon $D_1$ while causing the third vehicle 430 from the original platoon D to assume a new lead position in a second sub-platoon $D_2$ maintaining a leading position relative to a following vehicle 440. In one embodiment, the splitting of the original platoon D into two or more smaller platoons $D_1$ and $D_2$ is based on inter-vehicle V2V Unicast communication of adjacent vehicles (only one vehicle reciprocating to the broadcast by the transmitting member vehicle) for determining a discrepancy in relative safety and/or efficiency criteria ratings between adjacent vehicles above a predetermined threshold. In another embodiment, the splitting of the original platoon D into two or more smaller platoons $D_1$ and $D_2$ is based on inter-vehicle V2V Broadcast communication (plural vehicles reciprocating to the broadcast by the transmitting member vehicle) of adjacent vehicles for determining an overall safety and/or efficiency criteria rating of the two or more smaller platoons $D_1$ and $D_2$ to be greater than the overall safety and/or efficiency criteria rating of the original platoon D.

Platoon Splitting for Inter-Vehicle Safety/Efficiency Improvement:

In accordance with the first embodiment, each vehicle queries the immediately forward vehicle for receiving its safety and/or efficiency criteria rating. The querying vehicle then compares the received safety and/or efficiency criteria rating of the queried vehicle with its own safety and/or efficiency criteria rating to determine a difference, and then compares the difference against a predetermined threshold. When the difference is greater than the predetermined threshold, the querying vehicle determines that splitting the platoon is beneficial because of the difference discrepancy exceeding the predetermined threshold, and acts accordingly to split from the original platoon such as for example by taking the lead of a new smaller platoon. Conversely in this embodiment, when the difference is less than the predetermined threshold, the querying vehicle determines that splitting the platoon is not beneficial and acts accordingly to continue to follow the vehicle ahead.

In accordance with the example embodiment, determining the particular vehicle directly ahead (forward) of a querying vehicle is performed by receiving, by the querying vehicle, the location of all vehicles in the area of the querying vehicle, comparing the GPS location information contained in the data sent by the responding vehicles to the vehicle detected ahead via a radar system of the querying vehicle. The comparison considers whether the GPS location information contained in the data sent by the responding vehicles roughly corresponds with the known GPS location data of the querying vehicle, plus the radar detect location, and within the bounds of, for example, +/−1 meter, and coupled with information on the relative travel speeds of the vehicles (+/− some predetermined value). It is to be appreciated that other one or more bounds range(s) may be used as necessary and/or desired.

As noted above, each vehicle queries the immediately forward vehicle for receiving its safety and/or efficiency criteria rating. In accordance with the example embodiment, a raking or rating is developed for each platooning-approved driver. This input is then provided to the other drivers of the platooning vehicles. Inputs to the ranking system may include one or more values such as: citations against the driver, accidents, ranking from other drivers, hours of driving service, and hours platooning, for example. The ranking is provided to both drivers of a platooning vehicle pair (or to more vehicles forming the platoon) at the time the Network Operations Center (NOC) identifies the vehicles for platooning. At that time the drivers of each vehicle selectively indicate affirmatively if they want to platoon with the other vehicle using the driver ranking as an input. In this way, drivers may gain a level of confidence with the other operator(s) within the platoon. In addition, drivers may be incentivized to drive their platooning vehicles in a safe manner. Platooning would therefore be overall safer as bad drivers would be in a platoon less.

In the example embodiment, Platooning Driver Ranking is defined as:

$$\text{Ranking}=(n1*\text{weighting}1)+(n2*\text{weighting}2)+\ldots$$

The values for Nx above are defined by the company safety manager or weighting across all the driver of the fleet and/or data collected during driving which may without limitation include:

Citations;
Accidents;
Ranking from other drivers;
Current Hours of Service;
Total Hours of Service;
Current Hours platooning;
Total Hours platooning;
Current number of Lane Departures per hour;
Total Number of Lane Departures per hour;
Current Hard Braking events;
Total Hard Braking events;
Current Radar alerts per mile;
Total Radar alerts per mile;
Current hard braking events per mile;
Total hard braking events per mile;
Current number of collision alerts events per mile; and/or
Total number of collision alerts events per mile.

Some criteria may be sent from the fleet computer via broadcast over the air or other media and/or collected from the vehicle while driving. Weighting may be defined by the company safety manager based on fleet standards or default standard defined by the system manufacturer.

It is to be noted that the output of the equation is a unitless value which is used to compare other vehicles in the platoon with the same weighting values for the entire fleet. The Platooning Driver Ranking value may not be comparable to other vehicles with different weighting. In general vehicles from one fleet will only platoon with other vehicles from the same fleet.

TABLE I

| Vehicle | Rating | Maximum Inter-Vehicle Difference |
|---------|--------|----------------------------------|
| 410 | 15 | 25 |
| 420 | 25 | 25 |
| 430 | 70 | 25 |
| 440 | 75 | 25 |

For example, in order to quantitatively illustrate this embodiment and with reference to the Table I above, the lead vehicle 410 of the initial platoon D might have an overall safety and/or efficiency criteria rating of 15, the second vehicle 420 of the initial platoon D might have an overall safety and/or efficiency criteria rating of 25, the third vehicle 430 of the initial platoon D might have an overall safety and/or efficiency criteria rating of 70, and the trailing vehicle 440 of the initial platoon D might have an overall safety and/or efficiency criteria rating of 75. In addition, the predetermined threshold maximum difference between the compared safety and/or efficiency criteria rating might be, for example, selected to be 25 units. In accordance with the selective platoon splitting algorithm of this example embodiment then, a comparison by the second vehicle 420 of its safety and/or efficiency criteria rating (25) against the safety and/or efficiency criteria rating (15) of the leading vehicle 410 yields a result of 10 units, which is less than the predetermined threshold maximum difference of 25 units. Therefore, in the embodiment, the second vehicle 420 determines to not split from the platoon D and instead continues to follow the leading vehicle 410. It is to be appreciated that in accordance with this example embodiment, the second vehicle 420 determines to continue to follow the original leading vehicle 410 which, in the end, beneficially forms the sub-platoon $D_1$ (FIG. 4b) together with the leading vehicle 410 without regard to the platooning decisions made by any of the one or more vehicle(s) following the second vehicle resulting in improved safety and efficiency by maintaining at least the set of first and second vehicles 410, 420 in a small platoon $D_1$.

Similarly, a comparison by the fourth vehicle 440 of its safety and/or efficiency criteria rating (75) against the safety and/or efficiency criteria rating (70) of the third vehicle 430 yields a result of 5 units, which is less than the predetermined threshold maximum difference of 25 units, so in the embodiment the fourth vehicle 440 determines not split from platooning with the third vehicle 430 and instead continues to follow the third vehicle 430. It is to be appreciated that in accordance with this example embodiment, the fourth vehicle 440 determines to continue to follow the third vehicle 430 beneficially forming the sub-platoon $D_2$ (FIG. 4b) without regard to the platooning decisions made by any of the one or more vehicles ahead of the third vehicle 430 resulting in improved safety and efficiency by maintaining at least the set of third and fourth vehicles 430, 440 either in the small platoon $D_2$ or in the original larger platoon D.

However, in the example embodiment and for the same illustration purposes, a comparison by the third vehicle 430 of its safety and/or efficiency criteria rating (70) against the safety and/or efficiency criteria rating (25) of the second vehicle 420 yields a result of 45 units, which is more than the predetermined threshold maximum difference of 25 units. In this case, the third vehicle 430 determines to split from the platoon D thereby becoming the leader of a new sub-platoon $D_2$, by virtue of being followed by the fourth vehicle 440, while the second vehicle 420 continues to follow the leading vehicle 410 in the other new sub-platoon $D_1$.

Platoon Splitting for Overall Safety/Efficiency Improvement:

With continued reference to FIGS. 4a-4b, in another embodiment, the splitting of the original platoon D into two or more smaller platoons $D_1$ and $D_2$ is based on inter-vehicle V2V Broadcast communication between all of the vehicles for determining, based on the safety and/or efficiency criteria ratings of the vehicles of the platoon, that the pair of sub-platoons $D_1$ and $D_2$ in the example illustrated has an overall collective greater efficiency than the overall safety and efficiency of the single larger platoon D.

In accordance with this embodiment, each vehicle queries via the V2V Broadcast communication protocol all of the other vehicles in the platoon D for receiving each of their safety and/or efficiency criteria ratings. Each vehicle of the platoon also determines the various permutations of sub-platoons that could be formed by splitting the original platoon D into the sub-platoon permutations. Each vehicle of the platoon also calculates or otherwise computes a safety and/or efficiency criteria rating of each of the various sub-platoon permutations. In addition, each vehicle then determines to split from the platoon when it (the determining vehicle) is at the lead of a sub-platoon permutation that results in an overall improvement in safety and/or efficiency when the platoon is split relative to the platoon as original composed. When the benefit difference is greater than a threshold, the querying vehicle determines that its splitting of the platoon is beneficial and acts accordingly to split from the original platoon such as for example by taking the lead of a new smaller platoon. Conversely, when the benefit difference is less than the predetermined threshold, the querying vehicle determines that its splitting of the platoon is not beneficial and acts accordingly to continue to follow the vehicle ahead.

TABLE II

| Permutation | 410 | 420 | 430 | 440 | Collective Score |
|-------------|-----|-----|-----|-----|------------------|
| 1 | D | D | D | D | 75 |
| 2 | x | N | N | N | 60 |
| 3 | O | O | O | x | 50 |
| 4 | x | P | P | x | 65 |
| 5 | $D_1$ | $D_1$ | $D_2$ | $D_2$ | 100 |

Some of the platooning permutation decisions are represented in the Table II above and include, for example, the fourth vehicle 440 dropping off from the platoon D leaving a sub-platoon O (permutation 3) comprising the first 410, second 420, and third vehicles 430 when the fourth vehicle 440 determines that the safety and efficiency values of the sub-platoon comprising the first 410, second 420, and third vehicles 430 is greater than the combined safety and efficiency values of the original platoon of all four vehicles 410-440 together with the fourth 440 vehicle alone.

Another platooning permutation decision may include, for example, the first vehicle 410 dropping off from the platoon D leaving a sub-platoon N (permutation 2) comprising the second 420, third 430, and fourth 440 vehicles when the second vehicle 420 determines that the safety and efficiency values of the sub-platoon comprising the second 420, third 430, and fourth 440 vehicles is greater than the combined safety and efficiency values of the original platoon of all four vehicles 410-440 together with the first vehicle 410 alone.

Another platooning permutation decision may include, for example, the first and fourth vehicles 410 and 440 dropping off from the platoon D leaving a sub-platoon P (permutation 4) comprising the second 420 and third 430 vehicles when the second and fourth vehicles 420 and 440 determine that the safety and efficiency values of the sub-platoon comprising the second 420 and third 430 vehicles is greater than the combined safety and efficiency values of the original platoon of all four vehicles 410-440 together with the first vehicle 410 alone.

Still yet another platooning permutation decision (permutation 5) may include, for example and with particular reference to FIG. 4b, the second vehicle 420 dropping off from the platoon D leaving a first sub-platoon $D_1$ comprising the first 410 and second 420 vehicles, and as second sub-platoon $D_2$ comprising the third 430, and fourth 440 vehicles when the second vehicle 420 determines that the collective safety and efficiency values of the sub-platoons $D_1$ comprising the first 410 and second 420 vehicles, and $D_2$ comprising the third 430 and fourth 440 vehicles is greater than the combined safety and efficiency values of the original platoon of all four vehicles 410-440.

Figure 5A:
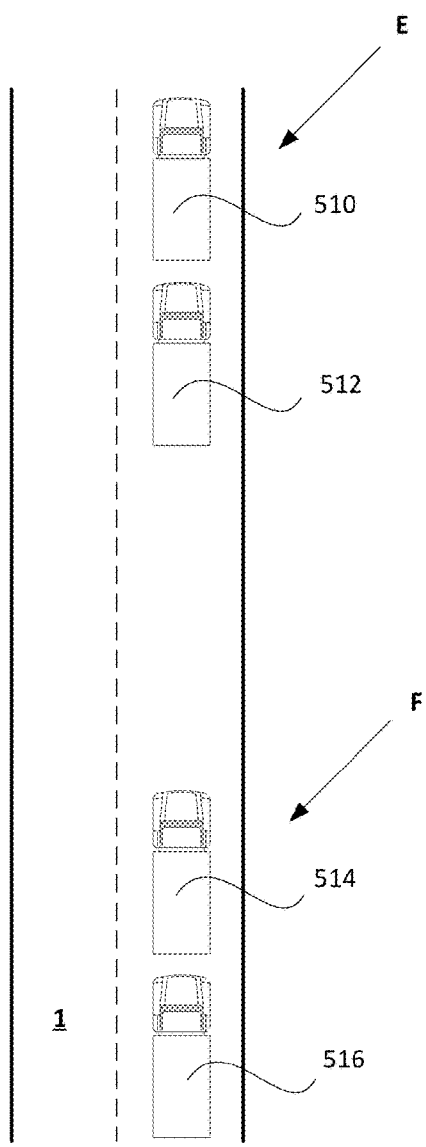
FIGS. 5a and 5b depict a sequence of operation for self-reordering of vehicles to join two smaller platoons into a single larger platoon by merging the two smaller platoons into the single larger platoon in accordance with an embodiment.

Platoon Joining/Merging for Inter-Vehicle Safety/Efficiency Improvement:

Converse to the platoon splitting decisions described above and with reference next to FIGS. 5a and 5b, a further example embodiment is illustrated wherein a pair of separate and distinct platoons E and F are merged or otherwise integrated into a single larger platoon G. As shown in the example, the first platoon E includes vehicles 510 and 512. The first platoon E is associated and integrated with the second platoon F including vehicles 514 and 516 thereby forming a new larger super-platoon G. FIG. 5a shows the vehicles 510 and 512 of the original platoon E arranged serially along the roadway 1. FIG. 5a also shows the vehicles 514 and 516 of the original platoon F arranged serially along the roadway 1. Then, using V2V Unicast communication communications (only one vehicle reciprocating to the broadcast by the transmitting member vehicle) and/or V2V Broadcast communication communications (plural vehicles reciprocating to the broadcast by the transmitting member vehicle) and one or more decision control protocol(s) to be described in greater detail below, the vehicles 510-516 self-orient by permitting the initial lead vehicle 510 (of the original platoon E) to maintain its lead position relative to a following vehicle 512, and the initial lead vehicle 514 (of the original platoon F) to maintain its lead position relative to a following vehicle 516, but merged into a larger single platoon G such as shown for example in FIG. 5b.

In one embodiment, the merging of the pair of separate and distinct platoons E and F into the single larger platoon G is based on inter-vehicle V2V Unicast communication of adjacent vehicles for determining a congruency in relative safety and/or efficiency criteria ratings between selected adjacent vehicles to be below a predetermined threshold. In another embodiment, the merging of the pair of separate and distinct platoons E and F into the single larger platoon G is based on inter-vehicle V2V Broadcast communication of adjacent vehicles for determining an overall safety and/or efficiency criteria rating of the single larger platoon G to be greater than the collective safety and/or efficiency criteria rating of the two or more smaller platoons E and F.

In accordance with the first embodiment, each vehicle queries via the V2V Unicast communication protocol the immediately forward vehicle for receiving its safety and/or efficiency criteria rating, compares the received safety and/or efficiency criteria rating of the queried vehicle with its own safety and/or efficiency criteria rating to determine a difference, and then compares the difference against the predetermined threshold described above. When the difference is less than the predetermined threshold, the querying vehicle determines that joining the vehicle ahead as a platoon is beneficial because of the difference discrepancy being less that the predetermined threshold, and acts accordingly to join with the vehicle ahead as a small platoon. Conversely in this embodiment, when the difference is greater than the predetermined threshold, the querying vehicle determines joining the leading vehicle as a platoon is not beneficial and acts accordingly to continue to lag the vehicle ahead without platooning.

TABLE III

| Vehicle | Rating | Maximum Inter-Vehicle Difference |
|---------|--------|----------------------------------|
| 510     | 15     | 25                               |
| 512     | 25     | 25                               |
| 514     | 30     | 25                               |
| 516     | 35     | 25                               |

For example, in order to quantitatively illustrate this embodiment and with reference to the Table III above, the lead vehicle 510 of the initial platoon E might have an overall safety and/or efficiency criteria rating of 15, the second vehicle 520 of the initial platoon E might have an overall safety and/or efficiency criteria rating of 25, the third vehicle 514 of the initial platoon F might have an overall safety and/or efficiency criteria rating of 30, and the trailing vehicle 516 of the initial platoon F might have an overall safety and/or efficiency criteria rating of 35. In addition, the predetermined threshold maximum difference between the compared safety and/or efficiency criteria rating might be, for example, selected to be 25 units.

In accordance with the selective platoon joining algorithm of this example embodiment then, a comparison by the third vehicle 514 of its safety and/or efficiency criteria rating (30) against the safety and/or efficiency criteria rating (25) of the second vehicle 512 yields a result of 5 units, which is less than the predetermined threshold maximum difference of 25 units. Therefore, in the embodiment, the third vehicle 514 determines to join the platoon E thereby forming the merged platoon G instead of continuing to lag the vehicles 510, 512 of the leading platoon E.

It is to be appreciated that in accordance with this example embodiment, the second vehicle 512 determines to continue to follow the original leading vehicle 510 which, in the end, beneficially forms the larger platoon G together with the leading vehicle 410 without regard to the platooning decisions made by any of the one or more vehicle(s) following the second vehicle resulting in improved safety and efficiency by maintaining at least the set of first and second vehicles 510, 512 of the small platoon E in the same order in the larger platoon G. Similarly in accordance with this example embodiment, the second vehicle 516 of the small platoon F determines to continue to follow the original leading vehicle 514 of the small platoon F which, in the end, also beneficially forms the larger platoon G together with the leading vehicle 5140 without regard to the platooning decisions made by any of the one or more vehicle(s) leading the second vehicle 516 of the small platoon F resulting in improved safety and efficiency by maintaining at least the set of first and second vehicles 514, 516 of the small platoon F in the same order in the larger platoon G.

Figure 5B:
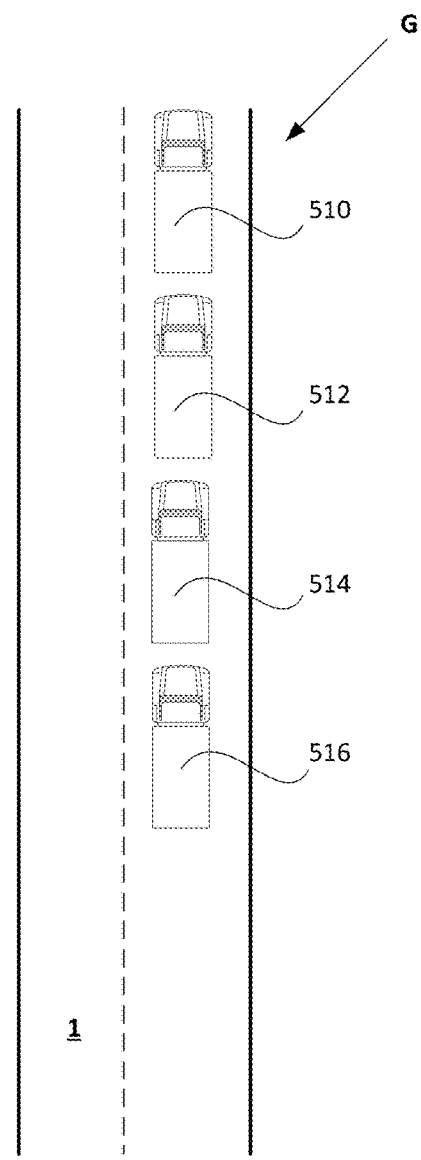

Platoon Joining/Merging: for Overall Safety/Efficiency Improvement:

With continued reference to FIGS. 5a-5b, in another embodiment, the joining of the original small platoons E, F into a larger single platoon G is based on inter-vehicle V2V Broadcast communication between all of the vehicles for determining, based on the safety and/or efficiency criteria ratings of the vehicles of the platoon, that the single larger platoon G has an overall greater efficiency than the collective overall safety and efficiency of the pair of small platoons E and F.

In accordance with this embodiment, each vehicle queries via the V2V Broadcast communication protocol all of the other vehicles in the platoons E, F for receiving each of their safety and/or efficiency criteria ratings. Each vehicle of the platoons also determines the various permutations one or more larger platoons that could be formed by merging the original small platoons E, F into a larger single platoon G. Each vehicle of the platoon also calculates or otherwise computes a safety and/or efficiency criteria rating of each of the various larger merged or single platoon permutations. In addition, each vehicle then determines to join another platoon thereby merging platoons when it (the determining vehicle) is at the lead of a small platoon that could join a vehicle or vehicles ahead resulting in an overall improvement in safety and/or efficiency when the platoon is merged into a single larger platoon. When the benefit difference is greater than a threshold, the querying vehicle determines that its merging of the platoon it is leading is beneficial and acts accordingly to join the platoon ahead such as for example by taking up the tail end of a new larger platoon. Conversely, when the benefit difference is less than the predetermined threshold, the querying vehicle determines that its joining into a larger platoon ahead is not beneficial and acts accordingly to continue to lag the vehicle ahead without platooning or otherwise merging the platoons.

TABLE IV

| Permutation | 510 | 520 | 5140 | 5160 | Collective Score |
|---|---|---|---|---|---|
| 1 | G | G | G | G | 100 |
| 2 | x | X | X | X | 60 |
| 3 | Y | Y | Y | x | 50 |
| 4 | x | Z | Z | x | 65 |
| 5 | E | E | F | F | 75 |

Some of the platooning permutation decisions are represented in the Table IV above and include, for example, the first vehicle 510 dropping off from the platoon E (FIG. 5a) and the third vehicle 514 joining with the second vehicle 512 thereby forming a new merged platoon X (permutation 2) when the second and third vehicles 512 and 514 determine that the safety and efficiency values of the new platoon X comprising the second 512, third 514 and fourth 516 vehicles is greater than the safety and efficiency value of vehicles travelling as the original platoons E and F.

Another platooning permutation decision may include, for example, the fourth vehicle 516 dropping off from the platoon F (FIG. 5a) and the third vehicle 514 joining with the second vehicle 512 thereby forming a new merged platoon Y (permutation 3) when the third and fourth vehicles 514 and 516 determine that the safety and efficiency values of the new platoon Y comprising the first 510, second 512, and third 514 vehicles is greater than the safety and efficiency value of vehicles travelling as the original platoons E and F.

Another platooning permutation decision may include, for example, the first and fourth vehicles 510 and 516 dropping off from their respective platoons E and F (FIG. 5a) leaving a sub-platoon Z (permutation 4) comprising the second 512 and third 514 vehicles when the second, third, and fourth vehicles 512, 514, and 516 determine that the safety and efficiency values of the sub-platoon Z comprising the second 512 and third 514 vehicles is greater than the safety and efficiency value of vehicles travelling as the original platoons E and F.

Still yet another platooning permutation decision may include, for example and with particular reference to FIG. 5b, the third and fourth vehicles 514 and 516 of the second platoon F joining with the first and second vehicles 510 and 512 of the first platoon E thereby forming the larger merged platoon G (permutation 1) when the third vehicle 514 determines that the collective safety and efficiency values of combined or merged platoon G is greater than the two platoons E and F operating separately.

Figure 6:
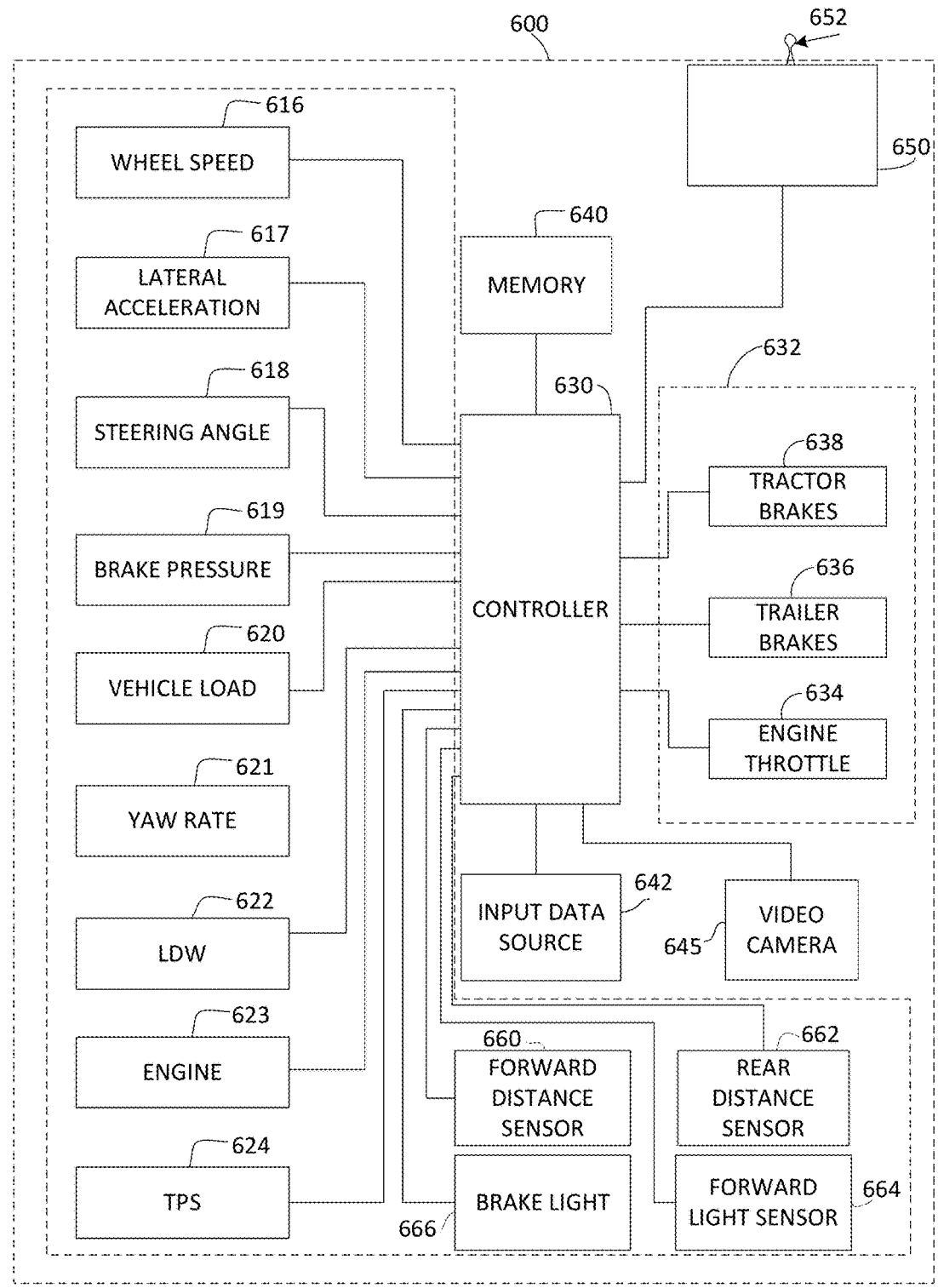
FIG. 6 is a schematic illustration of an exemplary embodiment of a data collection and communication module portion of the subject fleet management system according to the example embodiment.

With reference next to FIG. 6, a schematic representation of a data collection and communication module portion 600 according to principles of the example embodiment is illustrated. The data collection and communication module 600 may be adapted to detect, monitor, and report a variety of operational parameters and conditions of the commercial vehicle and the driver's interaction therewith, and to selectively intervene and take corrective action as may be needed or desired such as, for example, to maintain vehicle stability or to maintain the vehicle following distance relative to other vehicles within a platoon. In the exemplary embodiment of FIG. 6, the data collection and communication module 600 may include one or more devices or systems 614 for providing input data indicative of one or more operating parameters or one or more conditions of a commercial vehicle. For example, the devices 614 may be one or more sensors, such as but not limited to, one or more wheel speed sensors 616, a lateral acceleration sensor 617, a steering angle sensor 618, a brake pressure sensor 619, a vehicle load sensor 620, a yaw rate sensor 621, a lane departure warning (LDW) sensor or system 622, one or more engine condition sensors 623, and a tire pressure (TPMS) monitoring system 624. The data collection and communication module 600 may also utilize additional devices or sensors not described in the exemplary embodiment, or combine one or more devices or sensors into a single unit.

The data collection and communication module 600 may also include a logic applying arrangement 630, such as a controller or processor, in communication with the one or more devices or systems 614. The controller 630 may include one or more inputs for receiving input data from the devices or systems 614. The controller 630 may be adapted to process the input data and compare the raw or processed input data to a stored threshold value. The controller 630 may also include one or more outputs for delivering a control signal to one or more vehicle systems 632 based on the comparison. The control signal may instruct the systems 632 to intervene in the operation of the vehicle to initiate corrective action, and then report this corrective action to a wireless service (not shown) or simply store the data locally to be used for determining a driver quality. For example, the controller 630 may generate and send the control signal to an engine electronic control unit or an actuating device to reduce the engine throttle 634 and slowing the vehicle down. Further, the controller 630 may send the control signal to a vehicle brake system to selectively engage the brakes. In a tractor-trailer arrangement, the controller 630 may engage the brakes on one or more wheels of a trailer portion of the vehicle 636 and the brakes on one or more wheels of a tractor portion of the vehicle 638, and then report this corrective action to the wireless service or simply store the data locally to be used for determining a driver quality. A variety of corrective actions may be possible and multiple corrective actions may be initiated at the same time.

The controller 630 may also include a memory portion 640 for storing and accessing system information, such as for example the system control logic and control tuning. The memory portion 640, however, may be separate from the controller 630. The sensors 614 and controller 630 may be part of a preexisting system or use components of a preexisting system. For example, the Bendix® ABS-6™ Advanced Antilock Brake Controller with ESP® Stability System available from Bendix® Commercial Vehicle Systems LLC may be installed on the vehicle. The Bendix® ESP® system may utilize some or all of the sensors described in FIG. 2. The logic component of the Bendix® ESP® system resides on the vehicle's antilock brake system electronic control unit, which may be used for the controller 630 of the present invention. Therefore, many of the components to support the data collection and communication module 600 of the present invention may be present in a vehicle equipped with the Bendix® ESP® system, thus, not requiring the installation of additional components. The data collection and communication module 600, however, may utilize independently installed components if desired.

The data collection and communication module 600 may also include a source of input data 642 indicative of a configuration/condition of a commercial vehicle. The controller 630 may sense or estimate the configuration/condition of the vehicle based on the input data, and may select a control tuning mode or sensitivity based on the vehicle configuration/condition. The controller 630 may compare the operational data received from the sensors or systems 614 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 642 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 600 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 630 is operatively coupled with one or more video image capture devices shown in the example embodiment as a single video camera 645 representation of one or more physical video cameras disposed on the vehicle such as, for example, one video camera on each corner of the vehicle.

Still yet further, the data collection and communication module 610 may also include a transmitter module 650 such as, for example, a radio frequency (RF) transmitter including one or more antennas 652 for wireless communication of the one or more various vehicle configuration and/or condition data to one or more destinations such as, for example, to one or more wireless services 50, 60 (FIG. 1) having a corresponding receiver and antenna. The controller 630 is operative to communicate the acquired data to the one or more receivers in a raw data form, that is without processing the data, in a processed form such as in a compressed form, in an encrypted form or both as may be necessary or desired. In this regard, the controller 630 may combine selected ones of the vehicle parameter data values into processed data representative of higher level vehicle condition data such as, for example, data from the lateral acceleration sensor 618 may be combined with the data from the steering angle sensor 620 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

Figure 7:
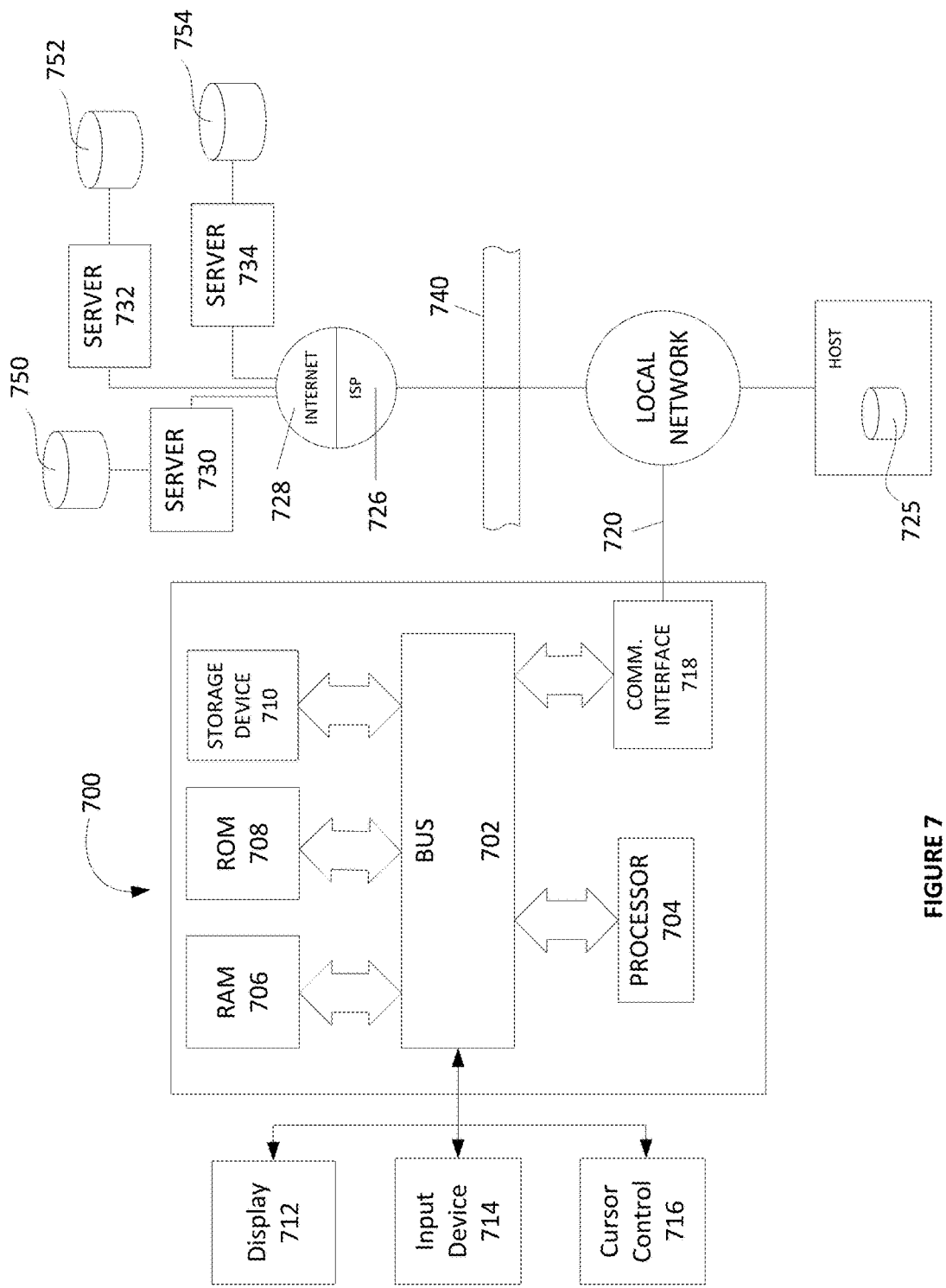
FIG. 7 is a block diagram that illustrates a platoon self-ordering computer system suitable for executing embodiments of one or more software systems or modules that perform fleet management and methods of monitoring and reporting according to the example embodiment.

FIG. 7 is a block diagram that illustrates a platoon self-ordering computer system 700 suitable for executing embodiments of one or more software systems or modules that perform fleet management and reporting analyses according to the subject application. The example system includes a bus 702 or other communication mechanism for communicating information, and a processor 704 coupled with the bus for processing information. The computer system includes a main memory, such as random access memory (RAM) 706 or other dynamic storage device for storing information and instructions to be executed by the processor 704, and read only memory (ROM) 708 or other static storage device for storing static information and instructions for the processor 704. A storage device 710 is also suitably provided for storing information and instructions.

The example embodiments described herein are related to the use of the computer system 700 for accessing, aggregating, manipulating and displaying information from multiple remote resources such as, for example, indirectly from multiple fleet vehicles 10, 20 and directly from multiple wireless services 50, 60. Further, the embodiments described herein are related to the use of computer system 700 for accessing information from the multiple sources in selective combination with internal proprietary data such as driver sensitive data, sales, costs, expense records, travel data, and the like from within a firewall 740. According to one implementation, information from the multiple remote public, commercial, and/or internal proprietary resources is provided by computer system 700 in response to the processor 7304 executing one or more sequences of one or more instructions contained in main memory 706. Such instructions may be read into main memory 706 from another computer-readable medium, such as storage device 710. Execution of the sequences of instructions contained in main memory 706 causes the processor 704 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 704 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The platoon self-ordering computer system 700 includes a communication interface 718 coupled to the bus 702 which provides a two-way data communication coupling to a network link 720 that is connected to local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 supporting a database 725 storing internal proprietary data and/or to data equipment operated by an Internet Service Provider (ISP) 726. ISP 726 in turn provides data communication services through the Internet 728. Local network 722 and Internet 728 both use electric, electromagnetic or optical signals that carry digital data streams. The signals through the various networks and the signals on network link 720 and through communication interface 718, which carry the digital data to and from the platoon self-ordering computer system 700, are exemplary forms of carrier waves transporting the information.

The platoon self-ordering computer system 700 can send messages and receive data, including program code, through the network(s), network link 720 and communication interface 718. In the Internet-connected example embodiment, the platoon self-ordering computer system 700 is operatively connected with a plurality of external public, private, governmental or commercial servers (not shown) as one or more wireless services 50, 60 configured to execute a web application in accordance with the example embodiment to be described below in greater detail. In the example embodiment shown, the first server 730 is coupled with a database 750 storing selected data received by a first wireless service such as for example data from a first telematics supplier, the second first server 732 is coupled with a database 752 storing selected data received by a second wireless service such as for example data from a second telematics supplier, and the third server 734 is coupled with a database 754 storing selected proprietary data and executable code for performing the web application. The platoon self-ordering computer system 700 is operative to selectively transmit a request for data to be selectively retrieved from the respective databases 750, 752, 754 through Internet 728, ISP 726, local network 722 and communication interface 718 or to receive selected data pushed from the databases 750, 752, 754, or by both means in accordance with the example embodiments. The received data is processed executed by the processor 704 as it is received, and/or stored in storage device 710, or other non-volatile storage for later processing or data manipulation.

Although platoon self-ordering computer system 700 is shown in FIG. 7 as being connectable to a set of three (3) servers, 730, 732, and 734, those skilled in the art will recognize that platoon self-ordering computer system 700 may establish connections to multiple additional servers on Internet 728. Each such server in the example embodiments includes HTTP-based Internet applications, which may provide information to platoon self-ordering computer system 700 upon request in a manner consistent with the present embodiments.

Selectively locating the proprietary commercial data in database 725 within the firewall 740 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The platoon self-ordering computer system 700 suitably includes several subsystems or modules to perform the platoon self-ordering management and driver and vehicle reporting analyses as set forth herein. A primary purpose of the subject application is to provide an improved intuitive and convenient user interface which allows a user to select parameters for performing platoon self-ordering and driver management and reporting analyses, and to make adjustments of the parameters based on the result presentation as necessary or desired.

Figure 8:
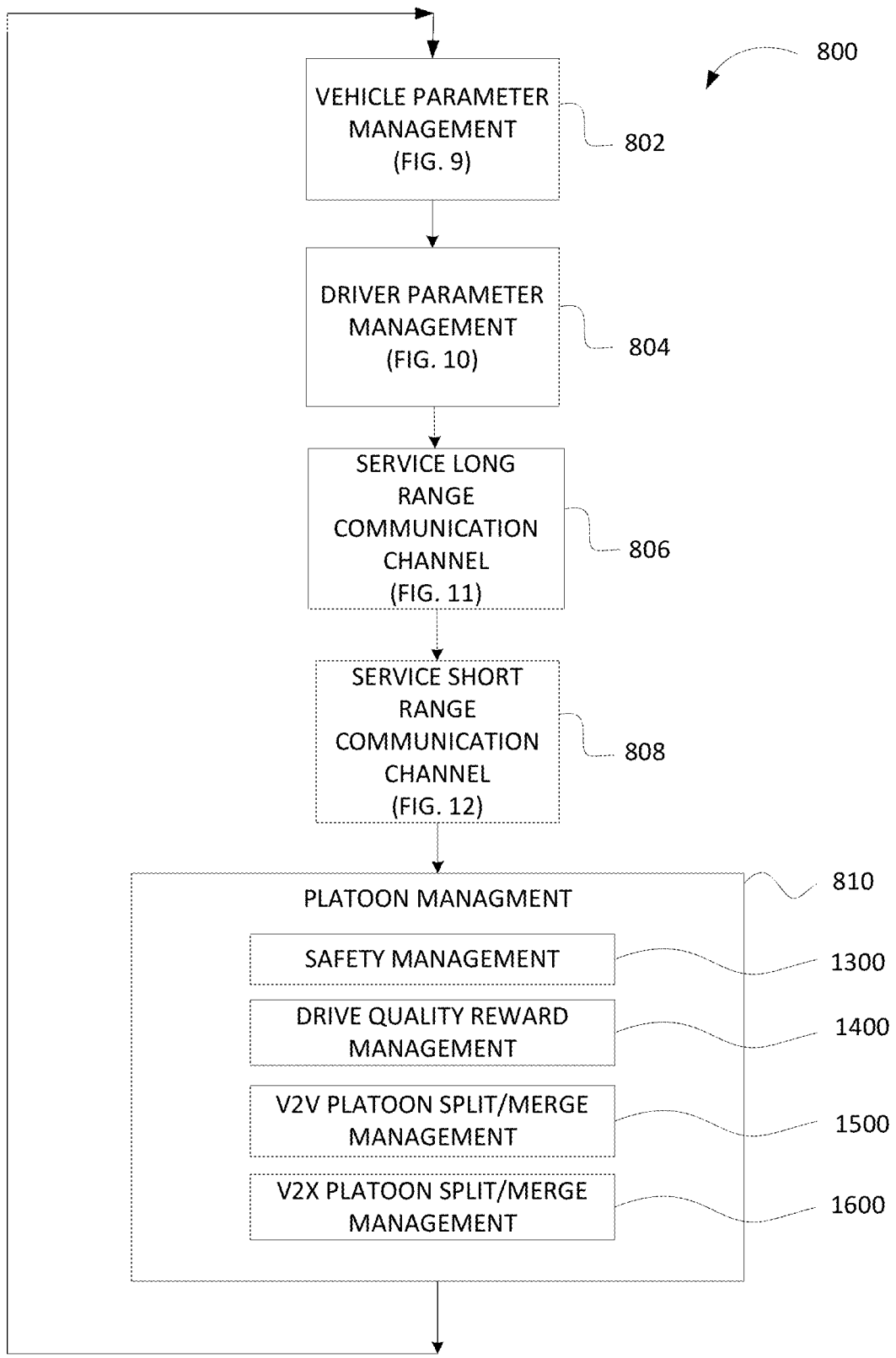
FIG. 8 is a flow diagram showing a control and communication method for platoon self-ordering in accordance with an example embodiment.

With reference next to FIG. 8, a control and communication method 800 for platoon self-ordering performed by the electronic system 12 of the example and embodiment will be described. As noted above, the electronic control system 12 is provided for communication and control functions. Logic such as software or other forms are executed by the processor of the control system 12 in order to conduct communication functionality, vehicle and driver parameter manipulation, and platoon management including, in the example embodiment, self-ordering of fleet vehicles in the platoon. Although the portions of the method 800 are illustrated as functioning serially, it is to be appreciated that the particular serial arrangement is for ease of illustration purposes only, and that the embodiments herein are not limited the exact serial execution, and may be executed in any particular order or in any combination order or in parallel by the control system or an equivalent control system as may be necessary or desired.

In one example, executable instructions associated with performing a method may be embodied as a logic encoded in one or more tangible media for execution. When executed, the instructions may perform a method. Thus, in one example, a logic encoded in one or more tangible media may store computer executable instructions that if executed by a machine (e.g., processor) cause the machine to perform method 800. While executable instructions associated with the above method are described as being embodied as a logic encoded in one or more tangible media, it is to be appreciated that executable instructions associated with other example methods described herein may also be stored on a tangible media.

The control method 800 includes a first step 802 wherein various one of more parameters of the vehicle are managed in a vehicle parameter management module or routine. Similarly, parameters relating to the driver of the vehicle are managed in a step 804 wherein a driver parameter management module or routine is performed. The vehicle and driver parameter management routines 802, 804 will be described in greater detail below with reference to FIGS. 9 and 10.

Long and short range communication protocol servicing is performed in steps 806 and 808 of the control method 800 for managing long range communication between the electronic control system 12 and the associated remote wireless communication 50 and/or the remote satellite system 60. To that end, a servicing step 806 is performed for tending to the long range communication protocol of the electronic control system 12 relative to remote communication systems 50, 60, where applicable. Is to be appreciated that the embodiments herein are functional with or without communication between the electronic control system 12 and the remote communication systems 50, 60 because, as will be described in greater detail below, the methods wherein related to self-ordering of fleet vehicles in a platoon wherein direct or indirect communications with one or more remote communication systems 50, 60 is unnecessary, and instead V2V Unicast and V2V Broadcast communications are used.

Accordingly, the control and communication method for platoon self-ordering 800 further includes a serving routine for V2V Unicast communication. More particularly, at step 808, servicing is performed by the electronic control system 12 for providing short range communication protocol functionality. The short range communication protocol functionality in the example embodiments provide for V2V Unicast and V2V Broadcast communications for the exchange of vehicle and driver parameter data between the vehicles in and/or among the platoons for enabling self-organization.

Lastly with regard to the control method 800 shown in FIG. 8, platoon management is performed at step 810 including a short platoon safety management method 1300 in accordance with an example embodiment, a driver quality reward management method 1400 for rewarding drivers having the highest quality rankings with preferred platoon positions in accordance with an example embodiment, a platoon split management method 1500 for selectively splitting a platoon into one or more smaller platoons in accordance with an example embodiment, and a platoon merge management method 1600 for selectively merging two or more platoons into a single larger platoon in accordance with an example embodiment, all of which will be described in greater detail below.

Figure 9:
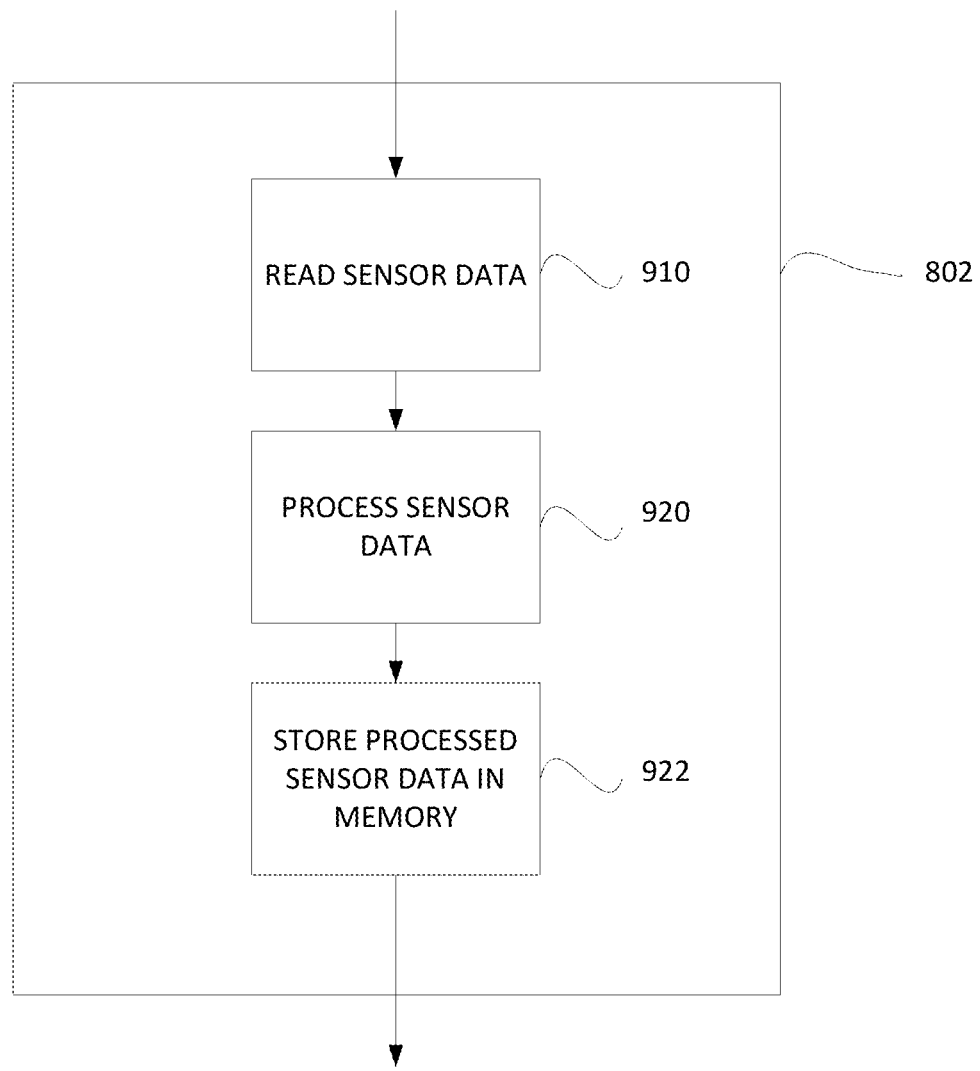
FIG. 9 is a flow diagram showing a vehicle parameter management method portion of the control and communication method of FIG. 8 for platoon self-ordering in accordance with an example embodiment.

The details of the vehicle parameter management function 802 of the control method 800 of FIG. 8 are illustrated in FIG. 9. The vehicle parameter management method 802 includes a first step 910 wherein the components of the control system 12 read or otherwise obtain data or signals from the sensors 616-624 (FIG. 6) of the vehicle. Sensor data is processed at 920 where in the process includes selectively converting and/or combining selected sensor data values to processed sensor data. The processed sensor data is stored at step 922 in the memory device 710 of the computer system 700.

Figure 10:
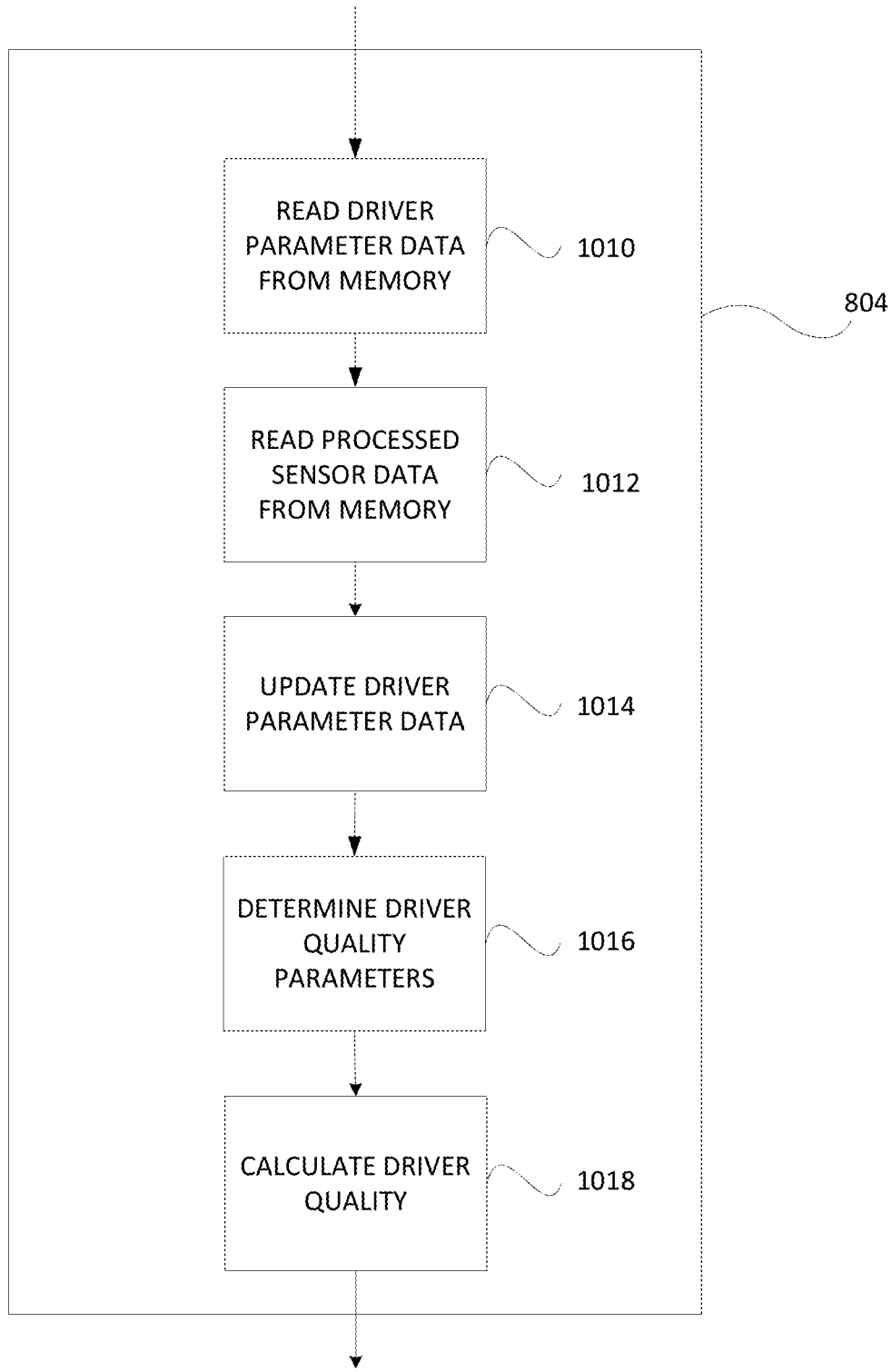
FIG. 10 is a flow diagram showing a driver parameter management method portion of the control and communication method of FIG. 8 for platoon self-ordering in accordance with an example embodiment.

FIG. 10 illustrates the details of the driver parameter management function 804 of the control method 800 of FIG. 8 in greater detail. With reference now to that figure, the processor of the electronic control system 10 reads at step 1010 driver parameter data from the memory and, at step 1012 read the processed sensor data from the memory. Then, at step 1014, the driver parameter data is updated and stored back into the memory 640 of the control system 12. In accordance with the example embodiment, the driver parameter data is updated based on the driver parameter read from the memory and also on the processed sensor data read from the memory. The updated data may reflect, for example, increased values representative of time spent by the driver behind the wheel and on the road. The updated driver parameter data might also include, for example, updates relative to lane departure warnings and/or hard braking events that might have occurred during a previous predetermined time interval. It is to be appreciated that, in the example embodiment, the updated driver parameter data is used by other functions of the control method 800 described herein for implementing self-ordering of vehicles in a platoon.

Driver quality parameters are determined at step 1016. Preferably, this step comprises determining values of one or more drivers quality parameters based on the driver parameter data. The driver quality parameters are defined by the company safety manager or weighting across all the driver of the fleet and/or data collected during driving which may without limitation include: citations; accidents; ranking from other drivers; current hours of service; total hours of service; current hours platooning; total hours platooning; current number of lane departures per hour; total number of lane departures per hour; current hard braking events; total hard braking events; current radar alerts per mile; total radar alerts per mile; current hard braking events per mile; total hard braking events per mile; current number of collision alerts events per mile; total number of collision alerts events per mile; or the like.

Next, at step 1018, an overall driver quality is calculated. Preferably, the driver quality is calculated based on the values of the one or more driver quality parameters obtained at step 1016. In the example embodiment, the platooning driver ranking is defined as set out above:

Ranking=(n1*weighting1)+(n2*weighting2)+. . .

The values for Nx above are preferably the driver quality parameters listed above defined by the company safety manager or weighting across all the driver of the fleet and/or data collected during driving.

Figure 11:
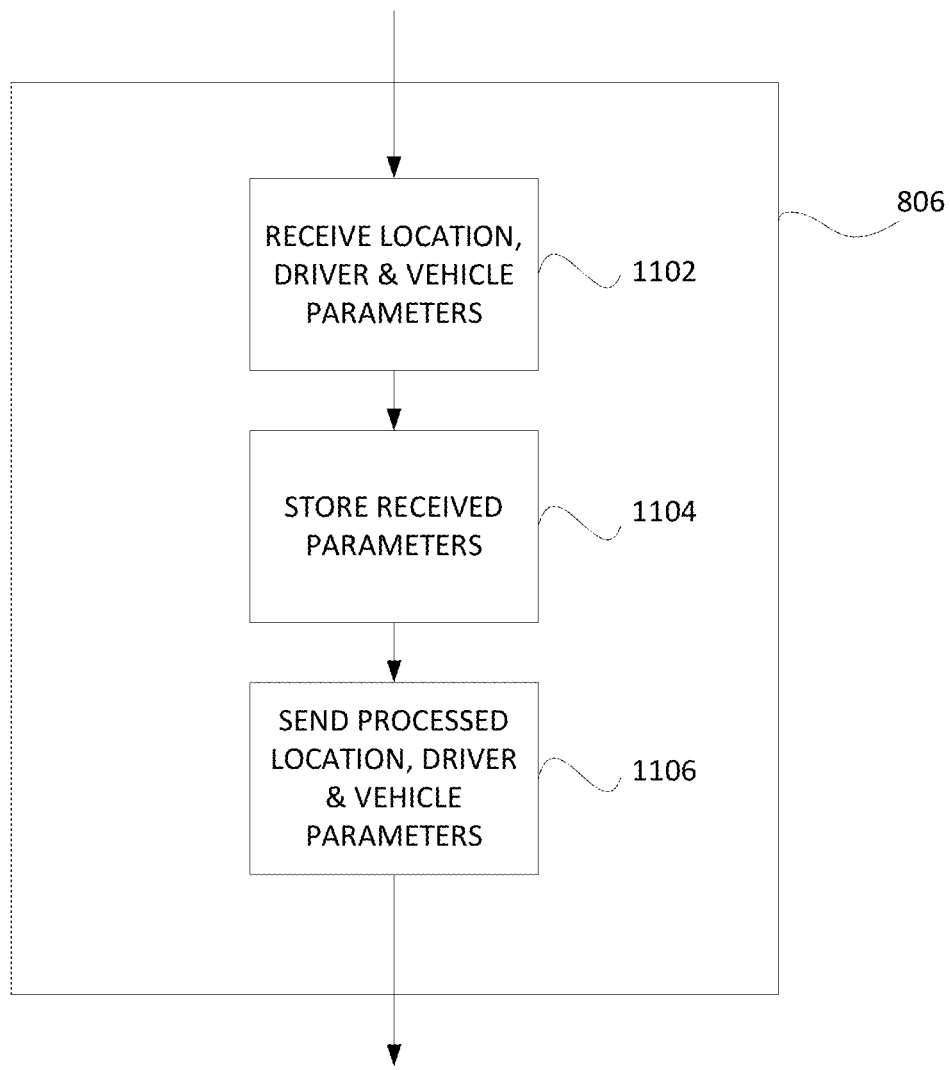
FIG. 11 is a flow diagram showing a long range communication servicing method portion of the control and communication method of FIG. 8 for platoon self-ordering in accordance with an example embodiment.

The long range communication protocol servicing method 806 portion of the control method 800 of FIG. 8 is illustrated in greater detail in FIG. 11. Turning now to that Figure, the long range communication serving method includes receiving location parameters, driver parameters and vehicle parameters from one or more of a remote wireless communication system 50 and/or a remote satellite system 60. These parameters are stored at step 1104 in the memory of the control system 12. Next, at step 1106, parameters relating to the location of the vehicle, driver performance, and other vehicle parameters are sent at step 1106 via the long range communication protocol to one or more of the remote wireless communication 50 and/or the remote satellite system 60.

Figure 12:
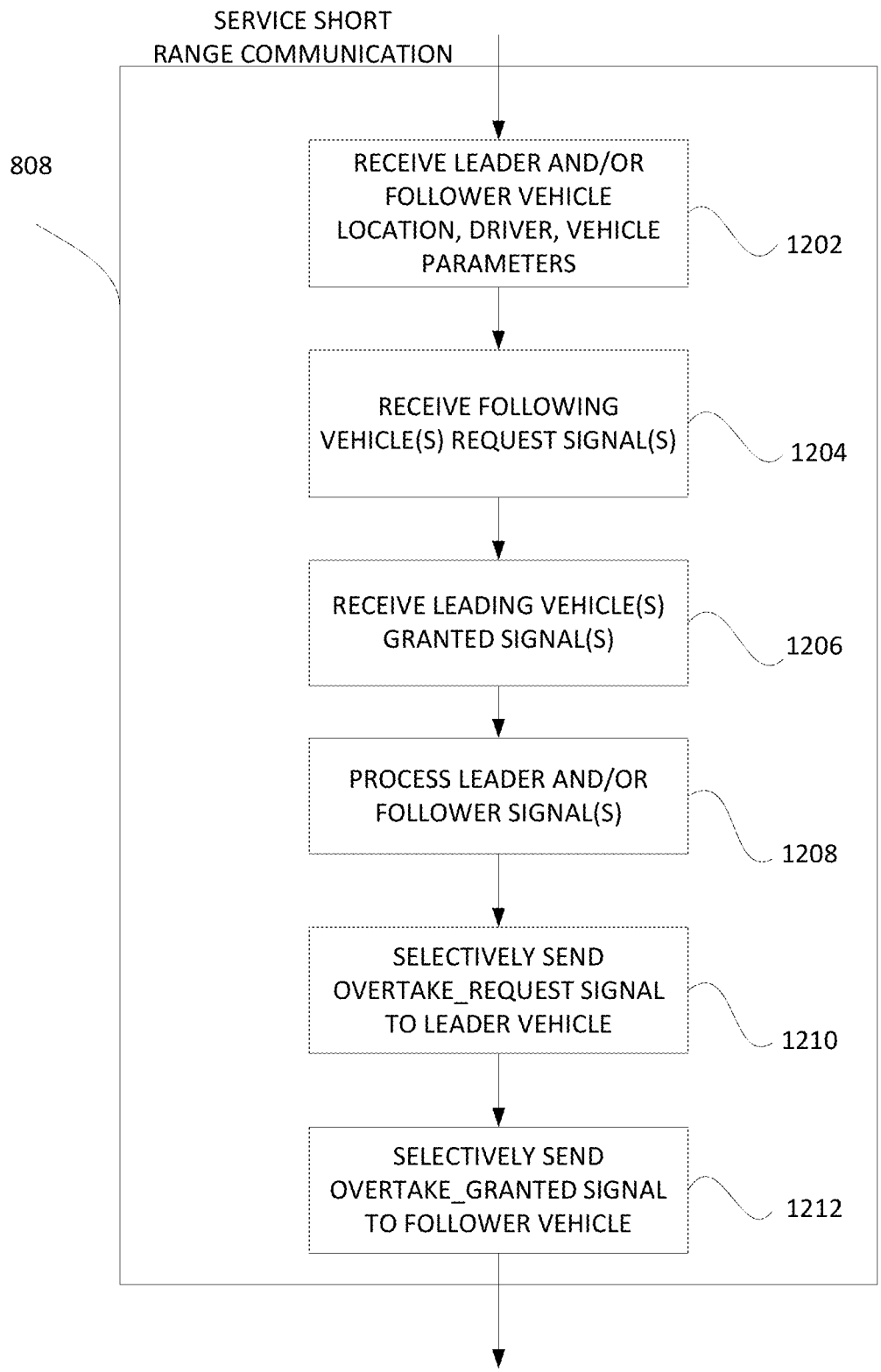
FIG. 12 is a flow diagram showing a short range communication servicing method portion of the control and communication method of FIG. 8 for platoon self-ordering in accordance with an example embodiment.

The short range communication protocol servicing function 808 portion of the control method 800 of FIG. 8 is illustrated in greater detail in FIG. 12. With reference now to that Figure, data relating to a leading and/or following vehicle is received at step 1202. In the example embodiment, the data received includes leading vehicle location data, leading vehicle driver performance data, and other leading vehicle parameters. The data also includes following vehicle location data, driver performance and/or quality data, and following vehicle parameter data. It is to be appreciated that, in the example embodiment, each vehicle could have a range of 0-n leading vehicles and a range of 0-n following vehicles based upon the position of the vehicle in a particular platoon.

Next, in step 1204, signals obtained from one or more following vehicles are received. More particularly, at step 1204, the control method 800 receives one or more signals from the one or more following vehicles including for example Overtake_Request signals, and/or Platooning_Request signals and/or Split_Platoon_Request signals and/or Merge_Platoon_Request signals, or the like. In accordance with the example embodiment, the one or more following vehicles may request, from a forward vehicle, permission to overtake using V2V Unicast communication of the Overtake_Request signal. Similarly in accordance with the example embodiment, the one or more following vehicles may request, from a forward vehicle, permission to platoon using V2V Unicast communication of the Platooning_Request signal. The one or more following vehicles may request, from a forward vehicle, permission to split the platoon using V2V Unicast communication of the Split_Platoon_Request signal. Further, the one or more following vehicles may request, from a forward vehicle, permission to merge platoons using V2V Unicast communication of the Merge_Platoon_Request signal.

Similarly, at step 1206, the short range communication routine 808 includes a step of receiving signals from leading vehicles including for example Overtake_Granted signals, and/or Platooning_Granted signals and/or Split_Platoon_Granted signals and/or Merge_Platoon_Granted signals, or the like. In accordance with the example embodiment, the one or more following vehicles may receive, from a forward vehicle, permission to overtake using V2V Unicast communication of the Overtake_Granted signal. Similarly in accordance with the example embodiment, the one or more following vehicles may receive, from a forward vehicle, permission to platoon using V2V Unicast communication of the Platooning_Granted signal. The one or more following vehicles may receive, from a forward vehicle, permission to split the platoon using V2V Unicast communication of the Split_Platoon_Granted signal. Further, the one or more following vehicles may receive, from a forward vehicle, permission to merge platoons using V2V Unicast communication of the Merge_Platoon_Granted signal. In this way and using reciprocal type signals to be described in greater detail below with regard to steps 1210 and 1212, the plural vehicles self-order into one or more efficient and safe platoons.

The leader and/or follower vehicle(s)' signal(s) received in step 1204 and 1206 are processed in steps 1208 in accordance with a vehicle self-ordering function to be described in greater detail below. As a result of the processing the method 800 includes in the short range combination portion 808 a step 1210 of selectively sending one or more of the Overtake_Request signals, the Platooning_Request signals, the Split_Platoon_Request signals, and/or the Merge_Platoon_Request signals to one or more leader vehicles whereby the vehicle executing the step 1210 may send a signal requesting that the vehicle may overtake the one or more leading vehicles.

Similarly, at step 1212, one or more of the Overtake_Granted signals, the Platooning_Granted signals, the Split_Platoon_Granted signals, and/or the Merge_Platoon_Granted signals is selectively set to one or more follower vehicles whereby the vehicle executing the step 1212 may grant permission to the one or more following vehicles to perform the overtake maneuver.

Figure 13:
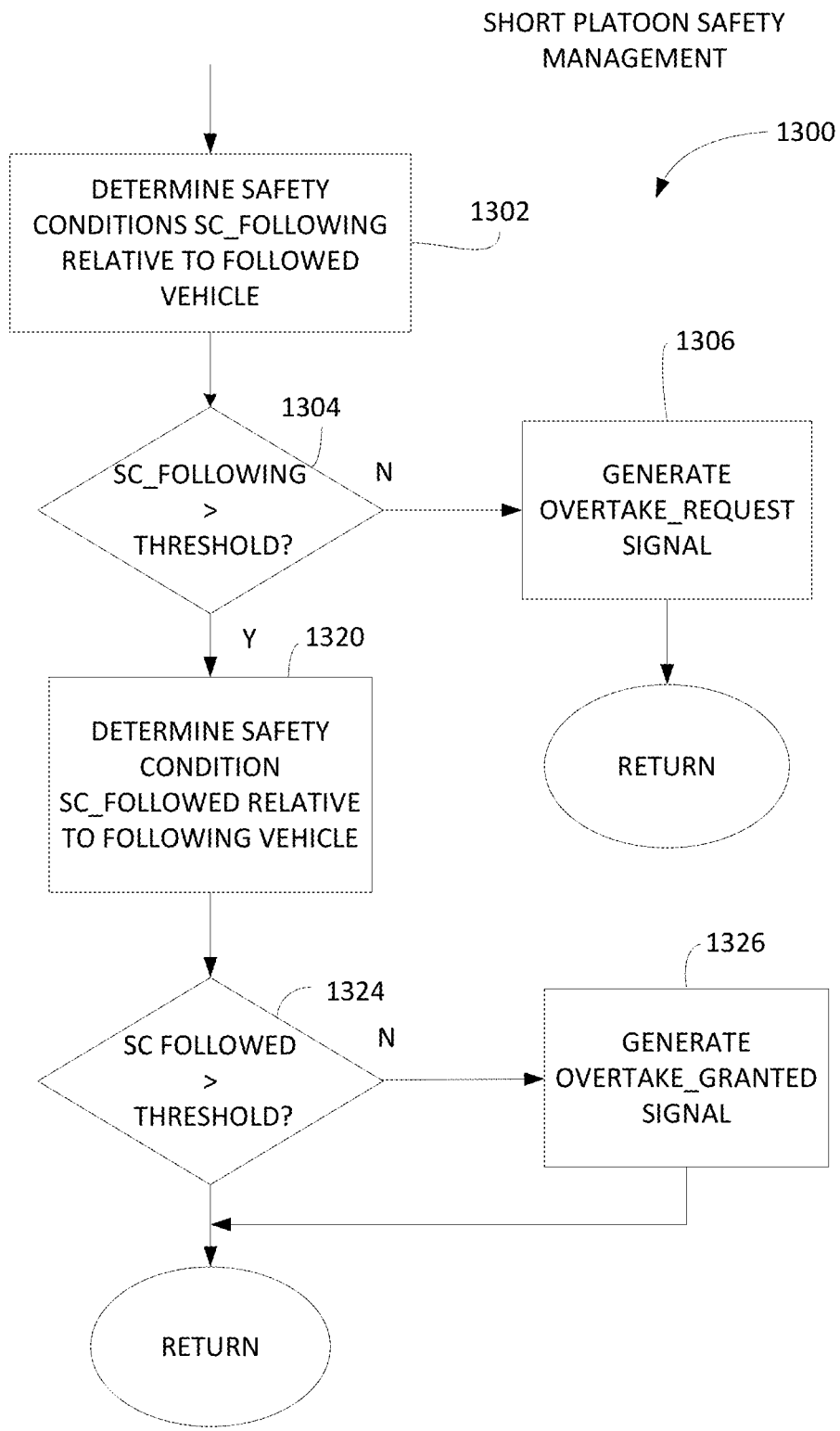
FIG. 13 is a flow diagram showing a short platoon safety management method of the platoon management portion of the control and communication method shown in FIG. 8 for short platoon safety management in accordance with an example embodiment.

The short platoon safety management method 820 portion of the platoon management function 810 of FIG. 8 is shown in greater detail in FIG. 13. With reference now to that Figure, the short platoon safety management function 820 includes a step of performing a short platoon safety management for ensuring that any one or more vehicles immediately adjacent forward or immediately adjacent behind the vehicle executing the short platoon management function 820 are properly arranged relative to safety concerns.

The details of the short platoon safety management function 820 are shown in greater detail in FIG. 13. First, at step 1302, a safety condition SC_following relative to a vehicle followed by the vehicle executing the step 1302 is determined. In accordance with that example embodiment, a safety condition relates to the relative braking abilities of the vehicles wherein a safe condition exists relative to a vehicle being followed when the vehicle being followed has less braking capability (stops slower) then the vehicle executing the step 1302 (stops faster). The safety condition SC_following is tested at step 1304 against a threshold and, if the safety condition is above the threshold, an Overtake_Request signal is generated at step 1306. In this example, since the safety condition is larger than the threshold value, it is vest that the vehicle executing the steps 1302, 1304 overtake the followed vehicle in order to increase the overall safety of the ordered vehicles in the platoon. However, if the safety condition SC_following relative to the forward vehicle is below the minimum set threshold, a safety condition relative to a following vehicle is determined at step 1320.

In the example embodiment, for example, a braking capability of the vehicle executing the step 1320 is compared relative to the braking capability of the following vehicle in order to ensure in steps 1324 and 1326 that the following vehicle can stop within the parameters of the vehicle executing the step 1320. More particularly, at step 1324, the safety condition SC_followed relative to the following vehicle is compared against a minimum threshold value and, if the safety condition SC_followed is above the minimum threshold, an overtake granted signal is generated at step 1326. On the other hand, if the following vehicle can stop within the bounds of the vehicles executing the step 1320, the short platoon safety management method 1302 is returned to the platoon management method 810.

Figure 14:
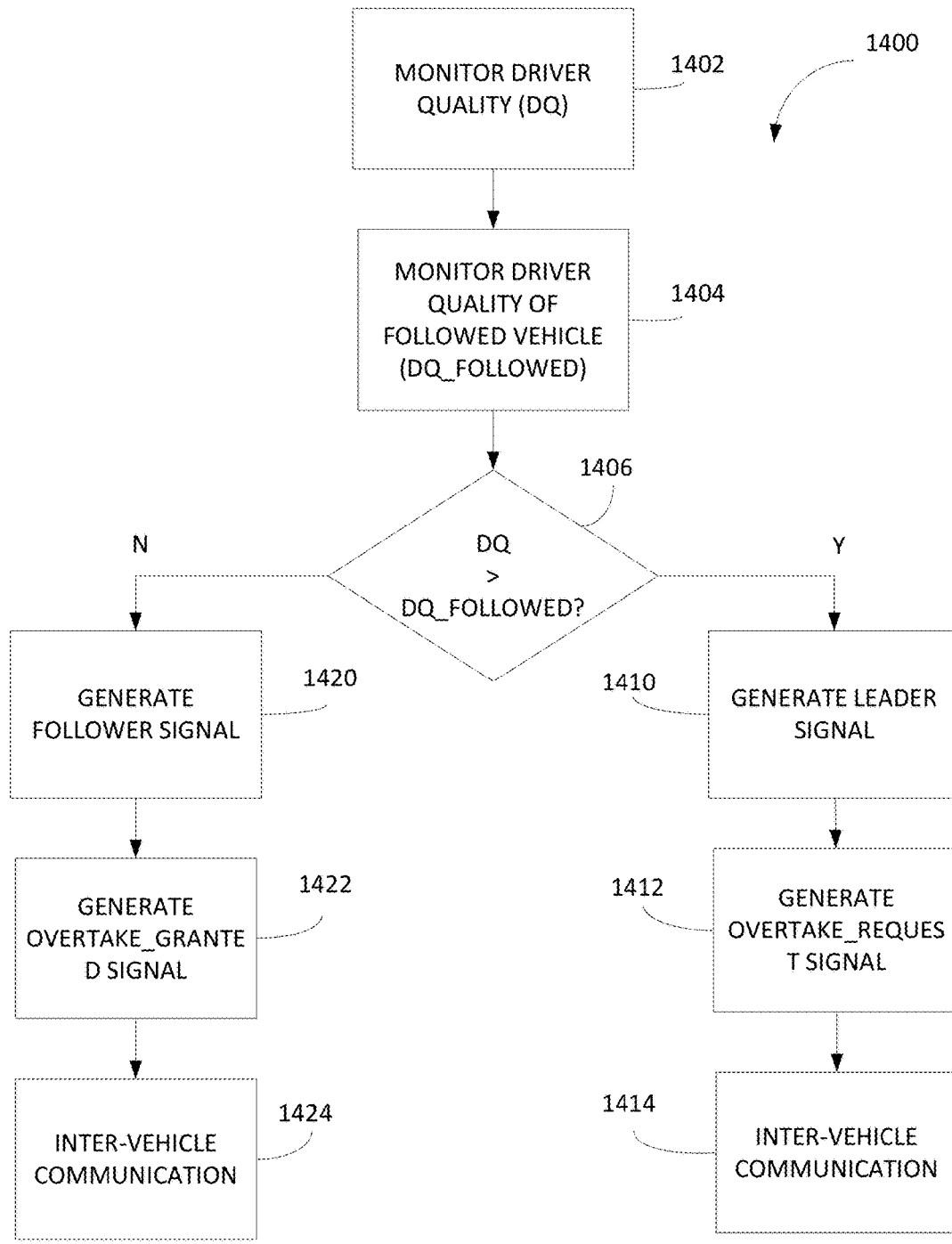
FIG. 14 is a flow diagram showing a driver quality reward management method of the platoon management portion of the control and communication method shown in FIG. 8 for rewarding drivers having the highest quality rankings with preferred platoon positions in accordance with an example embodiment.

The details of the driver quality reward management method 1400 of the platoon management portion 810 of the control and communication method 800 is illustrated in FIG. 14. The driver quality reward management method rewards drivers having the highest quality rankings with preferred platoon positions in accordance with the example embodiment. With reference now to FIG. 14, an example embodiment of the driver quality reward management method 1400 in accordance with the platoon management method steps 810 is shown.

A method 1400 of self-ordering a first vehicle relative to one or more other vehicles to operate the first and one or more other vehicles in a platoon in accordance with driver quality parameters is shown in FIG. 14.

A first driver quality parameter DQ of a first driver of the first vehicle in a platoon is monitored in a first step 1402. In accordance with the embodiment, the first quality parameter of the first driver is monitored through intra-vehicle communication. Next, at step 1404, a second driver quality parameter DQ_followed of a second driver of the second vehicle of the platoon is monitored. In accordance with the embodiment, the second quality parameter of the second driver is monitored through vehicle-to-vehicle (V2V) communication between the first vehicle and the second vehicle of the one or more other vehicles. A best driver from among the first and second drivers is determined at step 1406 in accordance with a comparison between the first driver quality parameter DQ of the first driver and the second driver quality parameter DQ_followed of the second driver.

In accordance with a result of the comparison at step 1406 between the first driver quality parameter DQ of the first driver and the second driver quality parameter DQ_followed of the second driver, one of either a LEADER signal or a FOLLOWER signal is generated for use by the first vehicle to assume either a leading position in the platoon relative to the second vehicle or a following position in the platoon relative to the second vehicle.

In the example embodiment, for a first result of the comparison at step 1406 determining the driver of the first vehicle to have a higher quality ranking than the second driver of the second vehicle, a LEADER signal is generated at step 1410 for managing the first vehicle to be a leading vehicle relative to the second vehicle. The LEADER signal is for use by the first vehicle to assume a leading position in the platoon relative to the second vehicle.

Further in the example embodiment, for a second result of the comparison at step 1406 determining the first vehicle to be a following vehicle relative to the second vehicle, a FOLLOWER signal is generated at step 1420 for managing the first vehicle to be a following vehicle relative to the second vehicle. The FOLLOWER signal is for use by the first vehicle to assume or maintain a following position in the platoon relative to the second vehicle.

The generating the LEADER signal 1410 for use by the first vehicle to assume the leading position in the platoon relative to the second vehicle comprises in the example embodiment generating at step 1412 an Overtake_Request signal for use by the second vehicle to concede a leading position in the platoon relative to the first vehicle, and sending at step 1414 via the V2V Unicast communication the Overtake_Reqest signal to the second vehicle. An Overtake_Granted signal may be received via the V2V Unicast communication and, responsive to receiving the Overtake_Granted signal by the first vehicle, the first vehicle may assume the leading position in the platoon relative to the second vehicle.

The generating the FOLLOWER signal 1420 for use by the first vehicle to assume the following position in the platoon relative to the second vehicle comprises in the example embodiment generating at step 1422 an Overtake_Granted signal for use by the second vehicle to take a leading position in the platoon relative to the first vehicle, and sending at step 1424 via the V2V Unicast communication the Overtake_Granted signal to the second vehicle. An Overtake_Request signal may be received via the V2V Unicast communication and, responsive to receiving the Overtake_Request signal by the first vehicle, the first vehicle may assume the following position in the platoon relative to the second vehicle conceding the position to the second vehicle.

Figure 15:
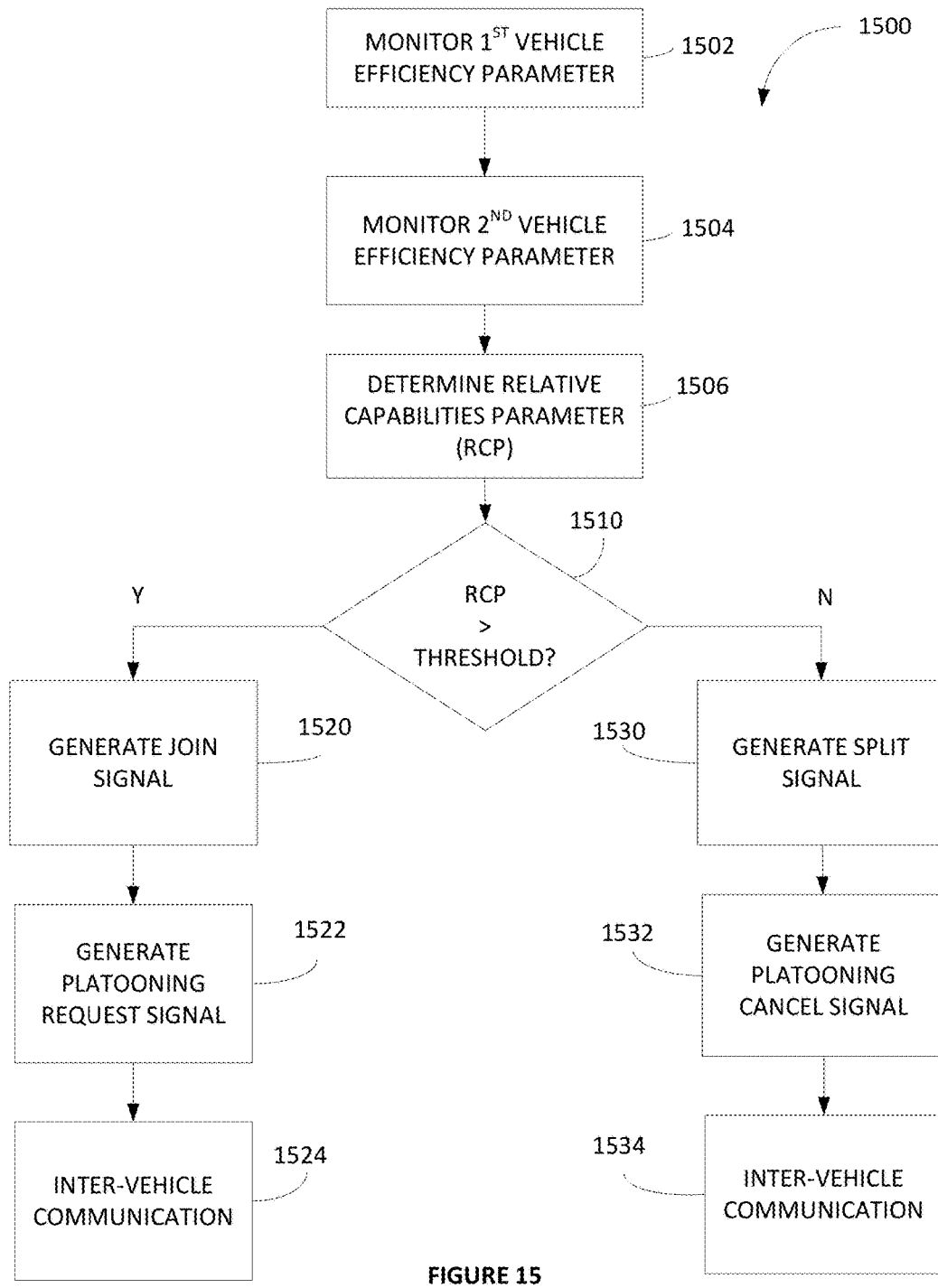
FIG. 15 is a flow diagram showing a vehicle-to-vehicle (V2V) platoon split/merge management method portion of the platoon management portion of the control and communication method shown in FIG. 8 for selectively splitting a platoon into one or more smaller platoons and for selectively merging one or more separate platoons into a single larger platoon in accordance with an example embodiment.

The details of the vehicle-to-vehicle (V2V) platoon split/merge management method 1500 of the platoon management portion 810 of the control and communication method 800 is illustrated in FIG. 15. The platoon split management method selectively splits a platoon into one or more smaller platoons in accordance with an example embodiment. With reference now to FIG. 15, an example embodiment of the platoon split management method 1500 in accordance with the platoon management method steps 810 is shown.

A vehicle-to-vehicle (V2V) platoon split/merge management method 1500 in accordance with an embodiment of platoon management 810 by a first vehicle relative to one or more other vehicles travelling together to selectively operate the first and one or more other vehicles in a platoon will now be described with reference to FIG. 15.

Within the first vehicle, at step 1502, a first safety and/or efficiency parameter of the first vehicle is monitored through intra-vehicle communication. Within the first vehicle, at step 1504, a second safety and/or efficiency parameter of the second vehicle is monitored through vehicle-to-vehicle (V2V) communication between the first vehicle and a second vehicle of the one or more other vehicles leading the first vehicle. A relative capabilities parameter is determined at step 1506. In the example embodiment, the relative capabilities parameter is a magnitude of a difference between the first safety and/or efficiency parameter of the first vehicle and the second safety and/or efficiency parameter of the second vehicle. A comparison is made at step 1510 whereat the relative capabilities parameter is compared against a predetermined capabilities threshold. In the example embodiment, one of either a JOIN signal or a SPLIT signal is generated in accordance with a result of the comparison between the relative capabilities parameter and predetermined capabilities threshold.

In particular, in accordance with a first result of the comparison between the relative capabilities parameter and predetermined capabilities threshold, the second vehicle leading the first vehicle while travelling together is determined to be a capable platoon leader vehicle relative to the first vehicle, and the JOIN signal is generated at step 1520. The JOIN signal is for use by the first vehicle to assume a following role in a platoon relative to the second vehicle.

Further in the example embodiment, in accordance with a second result of the comparison between the relative capabilities parameter and predetermined capabilities threshold, the second vehicle leading the first vehicle while travelling together is determined to be an incapable platoon leader vehicle relative to the first vehicle, and the SPLIT signal is generated at step 1530. SPLIT signal is for use by the first vehicle to discontinue the following role in the platoon relative to the second vehicle.

In the example embodiment, the generating the JOIN signal for use by the first vehicle to assume the following role in the platoon relative to the second vehicle comprises generating at step 1522 a Platooning_Request signal for use by the second vehicle to permit the following role by the first vehicle in the platoon relative to the second vehicle, and sending at step 1524 via the V2V Unicast communication the Platooning_Reqest signal to the second vehicle.

Further in the example embodiment, the generating the SPLIT signal for use by the first vehicle to discontinue the following role in the platoon relative to the second vehicle comprises generating at step 1532 a Platooning_Cancel signal for use by the second vehicle to discontinue the following role by the first vehicle in the platoon relative to the second vehicle, and sending at step 1534 via the V2V Unicast communication the Platooning_Cancel signal to the second vehicle.

Figure 16:
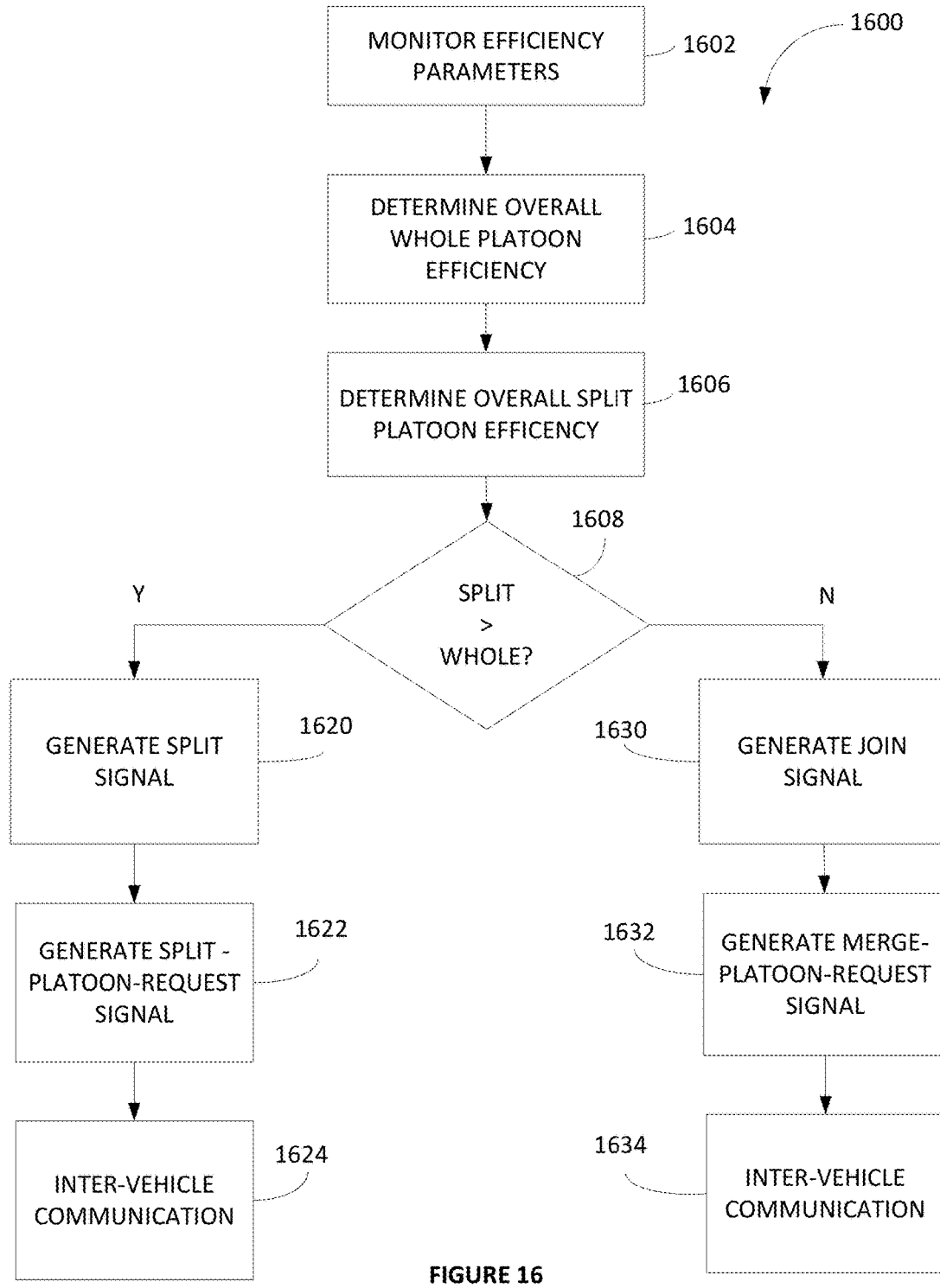
FIG. 16 is a flow diagram showing a vehicle-to-(many) vehicles (V2V Broadcast) platoon split/merge management method portion of the platoon management portion of the control and communication method shown in FIG. 8 for selectively splitting a platoon into one or more smaller platoons and for selectively merging one or more separate platoons into a single larger platoon in accordance with an example embodiment.

The details of the vehicle-to-(many)vehicles (V2V Broadcast) platoon split/merge management method 1600 of the platoon management portion 810 of the control and communication method 800 is illustrated in FIG. 16. The platoon merge management method selectively merges two or more platoons into a single larger platoon in accordance with an example embodiment. With reference now to FIG. 16, an example embodiment of the platoon merge management method 1600 in accordance with the platoon management method steps 810 is shown.

Efficiency parameters of each of the plurality of other vehicles travelling with the first vehicle in the platoon are monitored in step 1602. The monitoring of the efficiency parameters of each of the plurality of other vehicles travelling with the first vehicle in the platoon is in the example embodiment, through vehicle-to-(many)vehicle (V2V Broadcast) communication between the first vehicle and a plurality of other vehicles travelling with the first vehicle in a platoon.

An overall efficiency of the platoon comprising the first vehicle and a plurality of other vehicles travelling with the first vehicle in the platoon is determined at step 1604. In the example embodiment, the overall efficiency of the platoon is determined using the monitored efficiency parameters of each of the plurality of other vehicles travelling with the first vehicle in the platoon.

At step 1606, an overall split platoon efficiency is determined. In the example embodiment, the overall efficiency of the split platoon is determined by determining a first efficiency of a first portion of the platoon comprising the first vehicle and a plurality of other vehicles having a following role relative to the first vehicle, determining a second efficiency of a second portion of the platoon comprising the second vehicle and a plurality of other vehicles having a leading role relative to the second vehicle, and combining the first and second efficiencies.

The overall efficiency of the platoon is compared at step 1608 with the determined overall split platoon efficiency and, in accordance with a result of the comparing of the overall efficiency of the platoon with the determined overall split platoon efficiency, one of either a SPLIT signal or a JOIN signal is generated.

In accordance with a first result of the comparing of the overall efficiency of the platoon with the determined overall split platoon efficiency, the SPLIT signal is selectively generated at step 1620. The SPLIT signal is for use by the first vehicle to discontinue the following role in the platoon relative to the second vehicle.

In accordance with a second result of the comparing of the overall efficiency of the platoon with the determined overall split platoon efficiency, the JOIN signal is selectively generated at step 1630. JOIN signal is for use by the first vehicle to assume a following role relative to the second vehicle to thereby form the single merged platoon.

The generating the SPLIT signal at step 1620 for use by the first vehicle to discontinue the following role in the platoon relative to the second vehicle comprises generating an Split_Platoon_Request signal at step 1622 for use by the second vehicle to concede a leading position in the platoon relative to the first vehicle, and sending at step 1624 via the V2V Unicast communication the Split_Platoon_Reqest signal to the second vehicle.

The generating the JOIN signal at step 1630 for use by the first vehicle to assume the following role in the platoon relative to the second vehicle comprises generating at step 1632 an Merge_Platoon_Request signal for use by the second vehicle to assume a leading role relative to the first vehicle, and sending at step 1634 via the V2V Unicast communication the Merge_Platoon_Reqest signal to the second vehicle.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A method of self-ordering a first vehicle relative to one or more other vehicles to operate the first vehicle and one or more other vehicles in a platoon, the method comprising:
   within the first vehicle:
      monitoring through intra-vehicle communication a first quality parameter of a first driver of the first vehicle;
      monitoring, through inter-vehicle communication between the first vehicle and a second vehicle of the one or more other vehicles, a second quality parameter of a second driver of the second vehicle;
      determining a best driver from among the first and second drivers in accordance with a comparison between the first quality parameter of the first driver and the second quality parameter of the second driver; and in accordance with a result of the comparison between first quality parameter of the first driver and the second quality parameter of the second driver:
for a first result of the comparison, determining the first vehicle to be a leading vehicle relative to the second vehicle and generating a LEADER signal for use by the first vehicle to assume a leading position in the platoon relative to the second vehicle, the generating the LEADER signal further comprising:
generating an Overtake_Request signal for use by the second vehicle to concede a leading position in the platoon relative to the first vehicle; and
transmitting the Overtake_Reqest signal to the second vehicle via the inter-vehicle communication, or
for a second result of the comparison, determining the first vehicle to be a following vehicle relative to the second vehicle and generating a FOLLOWER signal for use by the first vehicle to assume or maintain a following position in the platoon relative to the second vehicle.

2. The method according to claim 1, further comprising:
receiving via the inter-vehicle communication an Overtake_Granted signal; and
responsive to receiving the Overtake_Granted signal by the first vehicle, assuming the leading position by the first vehicle in the platoon relative to the second vehicle.

3. The method according to claim 1, further comprising:
within the first the first vehicle:
sending, via the inter-vehicle communication to the second vehicle, the monitored first quality parameter of the first driver of the first vehicle.

4. A method of self-ordering a first vehicle relative to one or more other vehicles to operate the first and one or more other vehicles in a platoon, the method comprising:
within the first the first vehicle:
monitoring through intra-vehicle communication a first quality parameter of a first driver of the first vehicle;
monitoring, through inter-vehicle communication between the first vehicle and a second vehicle of the one or more other vehicles, a second quality parameter of a second driver of the second vehicle;
determining a best driver from among the first and second drivers in accordance with a comparison between the first quality parameter of the first driver and the second quality parameter of the second driver;
in accordance with a result of the comparison between first quality parameter of the first driver and the second quality parameter of the second driver:
for a first result of the comparison, determining the first vehicle to be a leading vehicle relative to the second vehicle and generating a LEADER signal for use by the first vehicle to assume a leading position in the platoon relative to the second vehicle, or
for a second result of the comparison, determining the first vehicle to be a following vehicle relative to the second vehicle and generating a FOLLOWER signal for use by the first vehicle to assume or maintain a following position in the platoon relative to the second vehicle;
transmitting the monitored first quality parameter of the first driver of the first vehicle to a third vehicle via the inter-vehicle communication;
receiving an Overtake_Request signal from the third vehicle via the inter-vehicle communication; and
transmitting via the inter-vehicle communication to the third vehicle an Overtake_Granted signal conceding to the third vehicle by the second vehicle a leading position of the second vehicle in the platoon relative to the third vehicle.

5. A method of platoon management by a first vehicle relative to one or more other vehicles travelling together to selectively operate the first and one or more other vehicles in a platoon, the method comprising:
within the first vehicle:
monitoring through intra-vehicle communication a first safety and/or efficiency parameter of the first vehicle;
monitoring, through inter-vehicle communication between the first vehicle and a second vehicle of the one or more other vehicles leading the first vehicle, a second safety and/or efficiency parameter of the second vehicle;
determining as a relative capabilities parameter a magnitude of a difference between the first safety and/or efficiency parameter of the first vehicle and the second safety and/or efficiency parameter of the second vehicle;
comparing the relative capabilities parameter with a predetermined capabilities threshold; and
in accordance with a result of the comparison between the relative capabilities parameter and predetermined capabilities threshold:
for a first result of the comparison, determining the second vehicle leading the first vehicle while travelling together to be a capable platoon leader vehicle relative to the first vehicle and generating a JOIN signal for use by the first vehicle to assume a following role in a platoon relative to the second vehicle, or
for a second result of the comparison, determining the second vehicle leading the first vehicle while travelling together to be an incapable platoon leader vehicle relative to the first vehicle and generating a SPLIT signal for use by the first vehicle to discontinue the following role in the platoon relative to the second vehicle.

6. The method according to claim 5, wherein:
the generating the JOIN signal for use by the first vehicle to assume the following role in the platoon relative to the second vehicle comprises:
generating a Platooning_Request signal for use by the second vehicle to permit the following role by the first vehicle in the platoon relative to the second vehicle; and
sending via the inter-vehicle communication the Platooning_Reqest signal to the second vehicle.

7. The method according to claim 6, further comprising:
receiving via the inter-vehicle communication a Platooning_Granted signal; and
responsive to receiving the Platooning_Granted signal by the first vehicle, assuming the following role position by the first vehicle in the platoon relative to the second vehicle.

8. The method according to claim 5, further comprising:
within the first the first vehicle:
sending, via the inter-vehicle communication to the second vehicle, the monitored first safety and/or efficiency parameter of the first vehicle.

9. The method according to claim 5, further comprising:
within the first vehicle:
- monitoring, through the inter-vehicle communication between the first vehicle and a plurality of other vehicles travelling with the first vehicle in a platoon, efficiency parameters of each of the plurality of other vehicles travelling with the first vehicle in the platoon;
- using the monitored efficiency parameters of each of the plurality of other vehicles travelling with the first vehicle in the platoon, determining an overall efficiency of the platoon comprising the first vehicle and a plurality of other vehicles travelling with the first vehicle in the platoon;
- determining an overall split platoon efficiency by determining a first efficiency of a first portion of the platoon comprising the first vehicle and a plurality of other vehicles having a following role relative to the first vehicle, determining a second efficiency of a second portion of the platoon comprising the second vehicle and a plurality of other vehicles having a leading role relative to the second vehicle, and combining the first and second efficiencies;
- comparing the overall efficiency of the platoon with the determined overall split platoon efficiency; and
- in accordance with a result of the comparing of the overall efficiency of the platoon with the determined overall split platoon efficiency:
  - selectively generating a SPLIT signal for use by the first vehicle to discontinue the following role in the platoon relative to the second vehicle.

10. The method according to claim 9 wherein:
the generating the SPLIT signal for use by the first vehicle to discontinue the following role in the platoon relative to the second vehicle comprises:
- generating an Split_Platoon_Request signal for use by the second vehicle to concede a leading position in the platoon relative to the first vehicle; and
- sending via the inter-vehicle communication the Split_Platoon_Reqest signal to the second vehicle.

11. The method according to claim 10, further comprising:
- receiving via the inter-vehicle communication a Split_Platoon_Granted signal; and
- responsive to receiving the Split_Platoon_Granted signal by the first vehicle, assuming the leading role by the first vehicle in the first portion of the platoon comprising the first vehicle and the plurality of other vehicles having the following role relative to the first vehicle.

12. The method according to claim 5, further comprising:
within the first vehicle:
- monitoring, through the inter-vehicle communication between the first vehicle and a plurality of other vehicles travelling with the first vehicle in separate first and second platoons, efficiency parameters of each of the plurality of other vehicles travelling with the first vehicle in the platoon;
- determining an overall split platoon efficiency by determining a first efficiency of the first portion comprising the first vehicle and a plurality of other vehicles having a following role relative to the first vehicle, determining a second efficiency of the second platoon comprising the second vehicle and a plurality of other vehicles having a leading role relative to the second vehicle, and combining the first and second efficiencies;
- using the monitored efficiency parameters of each of the plurality of other vehicles travelling with the first vehicle in the first and second platoons, determining an overall efficiency of a single merged platoon comprising the first vehicle and a plurality of other vehicles travelling with the first vehicle in the single merged platoon;
- comparing the overall efficiency of the single merged platoon with the determined overall split platoon efficiency; and
- in accordance with a result of the comparing of the overall efficiency of the single merged platoon with the determined overall split platoon efficiency:
  - selectively generating a JOIN signal for use by the first vehicle to assume a following role relative to the second vehicle to thereby form the single merged platoon.

13. The method according to claim 12 wherein:
the generating the JOIN signal for use by the first vehicle to assume the following role in the platoon relative to the second vehicle comprises:
- generating an Merge_Platoon_Request signal for use by the second vehicle to assume a leading role relative to the first vehicle; and
- sending via the inter-vehicle communication the Merge_Platoon_Reqest signal to the second vehicle.

14. The method according to claim 13, further comprising:
- receiving via the inter-vehicle communication a Merge_Platoon_Granted signal; and
- responsive to receiving the Merge_Platoon_Granted signal by the first vehicle, assuming the following role by the first vehicle relative to the second vehicle thereby forming the single merged platoon.

15. The method according to claim 5, further comprising:
within the first vehicle:
- monitoring through the intra-vehicle communication a first quality parameter of a first driver of the first vehicle;
- monitoring through the inter-vehicle communication between the first vehicle and the second vehicle of the one or more other vehicles, a second quality parameter of a second driver of the second vehicle;
- determining a best driver from among the first and second drivers in accordance with a comparison between the first quality parameter of the first driver and the second quality parameter of the second driver; and
- in accordance with a result of the comparison between first quality parameter of the first driver and the second quality parameter of the second driver:
  - for a first result of the comparison between the first and second quality parameters of the first and second drivers, determining the first vehicle to be a leading vehicle relative to the second vehicle and generating a LEADER signal for use by the first vehicle to assume a leading position in the platoon relative to the second vehicle, or
  - for a second result of the comparison between the first and second quality parameters of the first and second drivers, determining the first vehicle to be a following vehicle relative to the second vehicle and generating a FOLLOWER signal for use by the first vehicle to assume or maintain a following position in the platoon relative to the second vehicle.

16. A system for platoon management by an associated first vehicle relative to one or more other vehicles travelling together to selectively operate the first and one or more other vehicles in a platoon, the system comprising:
a platoon control unit configured to be disposed in the associated first vehicle, the platoon control unit comprising:
a processor;
a non-transient memory device operatively coupled with the processor; and
logic stored in the non-transient memory and executable by the processor to:
monitor through intra-vehicle communication a first safety and/or efficiency parameter of the first vehicle;
monitor, through inter-vehicle communication between the first vehicle and a second vehicle of the one or more other vehicles leading the first vehicle, a second safety and/or efficiency parameter of the second vehicle;
determine as a relative capabilities parameter a magnitude of a difference between the first safety and/or efficiency parameter of the first vehicle and the second safety and/or efficiency parameter of the second vehicle;
compare the relative capabilities parameter with a predetermined capabilities threshold; and
in accordance with a result of the comparison between the relative capabilities parameter and predetermined capabilities threshold:
for a first result of the comparison, determine the second vehicle leading the first vehicle while travelling together to be a capable platoon leader vehicle relative to the first vehicle and generate a JOIN signal for use by the first vehicle to assume a following role in a platoon relative to the second vehicle, or
for a second result of the comparison, determine the second vehicle leading the first vehicle while travelling together to be an incapable platoon leader vehicle relative to the first vehicle and generate a SPLIT signal for use by the first vehicle to discontinue the following role in the platoon relative to the second vehicle.

17. The system according to claim 16, wherein the logic of the platoon control unit is further executable by the processor to:
monitor, through the inter-vehicle communication between the first vehicle and a plurality of other vehicles travelling with the first vehicle in a platoon, efficiency parameters of each of the plurality of other vehicles travelling with the first vehicle in the platoon;
using the monitored efficiency parameters of each of the plurality of other vehicles travelling with the first vehicle in the platoon, determine an overall efficiency of the platoon comprising the first vehicle and a plurality of other vehicles travelling with the first vehicle in the platoon;
determine an overall split platoon efficiency by determining a first efficiency of a first portion of the platoon comprising the first vehicle and a plurality of other vehicles having a following role relative to the first vehicle, determining a second efficiency of a second portion of the platoon comprising the second vehicle and a plurality of other vehicles having a leading role relative to the second vehicle, and combining the first and second efficiencies;
compare the overall efficiency of the platoon with the determined overall split platoon efficiency; and
in accordance with a result of the comparing of the overall efficiency of the platoon with the determined overall split platoon efficiency:
selectively generate a SPLIT signal for use by the first vehicle to discontinue the following role in the platoon relative to the second vehicle.

18. The system according to claim 17, further comprising:
a communication transmitter operatively coupled with the platoon control unit, the communication transmitter being operable to:
generate, as the SPLIT signal, a Split_Platoon_Request signal for use by the second vehicle to concede a leading position in the platoon relative to the first vehicle; and
transmit the Split_Platoon_Reqest signal to the second vehicle.

19. The system according to claim 16, wherein the logic of the platoon control unit is further executable by the processor to:
monitor, through the inter-vehicle communication between the first vehicle and a plurality of other vehicles travelling with the first vehicle in separate first and second platoons, efficiency parameters of each of the plurality of other vehicles travelling with the first vehicle in the platoon;
determine an overall split platoon efficiency by determining a first efficiency of the first portion comprising the first vehicle and a plurality of other vehicles having a following role relative to the first vehicle, determining a second efficiency of the second platoon comprising the second vehicle and a plurality of other vehicles having a leading role relative to the second vehicle, and combining the first and second efficiencies;
using the monitored efficiency parameters of each of the plurality of other vehicles travelling with the first vehicle in the first and second platoons, determine an overall efficiency of a single merged platoon comprising the first vehicle and a plurality of other vehicles travelling with the first vehicle in the single merged platoon;
compare the overall efficiency of the single merged platoon with the determined overall split platoon efficiency; and
in accordance with a result of the comparing of the overall efficiency of the single merged platoon with the determined overall split platoon efficiency:
selectively generate a JOIN signal for use by the first vehicle to assume a following role relative to the second vehicle to thereby form the single merged platoon.

20. The system according to claim 19, further comprising:
a communication transmitter operatively coupled with the platoon control unit, the communication transmitter being operable to:
generate, as the JOIN signal, a Merge_Platoon_Request signal for use by the second vehicle to assume a leading role relative to the first vehicle; and
transmit the Merge_Platoon_Request signal to the second vehicle.

21. The system according to claim 16, wherein the logic of the platoon control unit is further executable by the processor to:

monitor through the intra-vehicle communication a first quality parameter of a first driver of the first vehicle;

monitor through the inter-vehicle communication between the first vehicle and the second vehicle of the one or more other vehicles, a second quality parameter of a second driver of the second vehicle;

determine a best driver from among the first and second drivers in accordance with a comparison between the first quality parameter of the first driver and the second quality parameter of the second driver; and in accordance with a result of the comparison between first quality parameter of the first driver and the second quality parameter of the second driver:

for a first result of the comparison between the first and second quality parameters of the first and second drivers, determine the first vehicle to be a leading vehicle relative to the second vehicle and generate a LEADER signal for use by the first vehicle to assume a leading position in the platoon relative to the second vehicle, or for a second result of the comparison between the first and second quality parameters of the first and second drivers, determine the first vehicle to be a following vehicle relative to the second vehicle and generate a FOLLOWER signal for use by the first vehicle to assume or maintain a following position in the platoon relative to the second vehicle.

\* \* \* \* \*